US009805471B2

United States Patent
Itoh et al.

(10) Patent No.: US 9,805,471 B2
(45) Date of Patent: Oct. 31, 2017

(54) INFORMATION PROCESSING APPARATUS, INFORMATION PROCESSING SYSTEM, AND INFORMATION PROCESSING METHOD

(71) Applicants: Atsushi Itoh, Kanagawa (JP); Yuki Wakita, Tokyo (JP); Junko Nakano, Tokyo (JP)

(72) Inventors: Atsushi Itoh, Kanagawa (JP); Yuki Wakita, Tokyo (JP); Junko Nakano, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 36 days.

(21) Appl. No.: 14/936,055

(22) Filed: Nov. 9, 2015

(65) Prior Publication Data
US 2016/0140704 A1 May 19, 2016

(30) Foreign Application Priority Data
Nov. 17, 2014 (JP) ................................. 2014-232886

(51) Int. Cl.
*G06K 9/46* (2006.01)
*G06K 9/66* (2006.01)
(Continued)

(52) U.S. Cl.
CPC ........ *G06T 7/003* (2013.01); *G06F 17/30247* (2013.01); *G06F 17/30268* (2013.01); *G06K 9/46* (2013.01); *G06T 7/337* (2017.01)

(58) Field of Classification Search
CPC ........ G06F 17/30247; G06F 17/30268; G06K 9/46; G06K 9/6215; G06T 7/003
(Continued)

(56) References Cited

U.S. PATENT DOCUMENTS 9,525,758 B2 * 12/2016 Yasuma ................. H04L 67/42
2009/0204607 A1 8/2009 Matsuzawa
(Continued)

FOREIGN PATENT DOCUMENTS

JP 2014-010722 1/2014
JP 2014-010723 1/2014
(Continued)

OTHER PUBLICATIONS

Extended European Search Report dated Apr. 13, 2016 in European Patent Application No. 15194740.5.

*Primary Examiner* — Kanjibhai Patel
(74) *Attorney, Agent, or Firm* — Oblon, McClelland, Maier & Neustadt, L.L.P.

(57) ABSTRACT

An information processing apparatus that controls registration of an image and association information to a registration unit of an image retrieval device that includes the registration unit in which the image and association information are registered in an associated manner, a retrieving unit that retrieves an image being similar to a retrieval subject image from the registration unit, and a transmitting unit that transmits the association information associated with the retrieved image to a terminal device, the information processing apparatus comprising: a selecting unit that selects the association information to be associated with a registration target image to be registered in the registration unit; a setting unit that performs setting to a setting item according to the association information selected by the selecting unit; and a transmitting unit that transmits the registration target image and the association information in which the setting item is set, to the image retrieval device.

14 Claims, 20 Drawing Sheets

(51) Int. Cl.
*G06T 7/00* (2017.01)
*G06F 17/30* (2006.01)
*G06T 7/33* (2017.01)

(58) Field of Classification Search
USPC .......................................................... 382/190
See application file for complete search history.

(56) References Cited

U.S. PATENT DOCUMENTS

| | | |
|---|---|---|
| 2014/0006387 A1 | 1/2014 | Kishi et al. |
| 2014/0006435 A1 | 1/2014 | Kishi et al. |
| 2014/0059072 A1 | 2/2014 | Kawara |
| 2014/0344275 A1* | 11/2014 | Matsuda ........... G06F 17/30867 707/737 |
| 2014/0362235 A1 | 12/2014 | Kishi et al. |
| 2015/0016675 A1 | 1/2015 | Kishi |
| 2015/0381630 A1 | 12/2015 | Kishi et al. |

FOREIGN PATENT DOCUMENTS

| | | |
|---|---|---|
| JP | 2014-238742 | 12/2014 |
| JP | 2015-018405 | 1/2015 |
| JP | 2016-12207 A | 1/2016 |

\* cited by examiner

```

<hotspot>
    <area>x1,y1,x2,y2</area>
    <link>
        <title>****Shop Web Page</title>
        <type>info</type>
        <URI>http://1.example.org/index.html</URI>
    </link>
    <link>
        ⋮
    </link>
  </hotspot>
  <hotspot>
    ⋮
  </hotspot>

| No. | ICON NAME | ICON | ACTIVATED APP CHOICE | TITLE | URL | SHORTENED URL/ SHORTENED URL SETTING BUTTON | TELE- PHONE NUMBER | To/ Subject | Body | PUBLIC DEVICE | GPS | Collection | SNS (#A, #B) | OpenIn |
|---|---|---|---|---|---|---|---|---|---|---|---|---|---|---|
| 1 | A-Store | A-St | Place | ◎ | ◎ | ○ | | | | △ | | △ | | |
| 2 | E-mail | Mail | E-mail | ◎ | | | | ◎ | | △ | △ | △ | | |
| 3 | External | Ext | Place | ◎ | ◎ | ○ | | | | | | △ | △ | △ |
| 4 | SNS#A | SNS #A | INTERNAL BROWSER/ Place | ◎ | ◎ | ○ | | | | △ | △ | △ | △ | △ |
| 5 | Maps | Maps | INTERNAL BROWSER/ Map/Place | ◎ | ◎ | ○ | | | | | △ | △ | △ | |
| 6 | Multimedia | MM | INTERNAL PLAYER/Place | ◎ | ◎ | ○ | | | | △ | △ | △ | △ | △ |
| 7 | PDF | PDF | INTERNAL BROWSER/ Place | ◎ | ◎ | ○ | | | | △ | △ | △ | △ | |
| 8 | Phone | Phn | Phone | ◎ | | | ◎ | | | | | | | |
| 9 | P-Store | P-St | Place | ◎ | ◎ | ○ | | | | △ | △ | △ | △ | △ |
| 10 | Shopping | Shop | INTERNAL BROWSER/ Place | ◎ | ◎ | ○ | | | | △ | △ | △ | | |
| 11 | SMS | SMS | Phone | ◎ | | | ◎ | | ◎ | | | | | |
| 12 | SNS#B | SNS #B | INTERNAL BROWSER/ Place | ◎ | ◎ | ○ | | | | △ | △ | △ | | △ |
| 13 | WebView | Web | INTERNAL BROWSER | ◎ | ◎ | ○ | | | | | △ | △ | △ | △ |
| 14 | Movie | Y | INTERNAL BROWSER/ DEDICATED Movie/Place | ◎ | ◎ | ○ | | | | | | △ | △ | △ |

INFORMATION PROCESSING APPARATUS, INFORMATION PROCESSING SYSTEM, AND INFORMATION PROCESSING METHOD

CROSS-REFERENCE TO RELATED APPLICATIONS

The present application claims priority to and incorporates by reference the entire contents of Japanese Patent Application No. 2014-232886 filed in Japan on Nov. 17, 2014.

BACKGROUND OF THE INVENTION

1. Field of the Invention

The present invention relates to an information processing apparatus, an information processing system, and an information processing method.

2. Description of the Related Art

There has been known an image retrieval technique in which feature points are extracted from, for example, a captured image that is obtained by imaging with a camera, and an image having many feature points similar to the extracted feature points is retrieved from a group of images that are registered in advance. And, there has been known a technique using the image retrieval technique. The known technique registers images of specific photographs and printed materials in a database associating with various electronic data, retrieves a similar image from the database based on captured images that are obtained by imaging these photographs and printed materials, and provides association information that is associated with the similar image (for example, Japanese Laid-open Patent Publication No. 2014-010723).

Moreover, for an image processing apparatus, there has been widely used a technique that provides a user with a program or a service that corresponds to, for example, data provided externally. For example, an operating system (OS) that is installed in an image processing apparatus selects a corresponding program or service from among those registered in the OS based on an extension or the like included in a file name of the data provided externally, and provides a user with the selected the corresponding program or service.

Incidentally, there are cases in which a program or a service that is different from a program or a service that is provided by the OS is desired to be associated with the association information presented as a result of retrieval by the image retrieval technique described above, or in which more than one program or service are desired to be associated therewith. In such cases, there has been a problem that complicated settings are necessary when association information is registered in a database in the conventional technique.

In view of the above problem, there is a need to facilitate registration of association information in a system in which the association information as a result of image retrieval is output.

SUMMARY OF THE INVENTION

It is an object of the present invention to at least partially solve the problems in the conventional technology.

According to example embodiments of the present invention, there is provided an information processing apparatus comprising: a communication unit that is connected to the image retrieval device via a network, the image retrieval device including a registration unit in which an image and one or more pieces of association information are registered in an associated manner, a retrieving unit that retrieves an image that is similar to a retrieval subject image from the registration unit, and a transmitting unit that transmits the one or more of association information associated with the retrieved image to a terminal device; a selecting unit that selects, from a plurality types of the association information, the association information to be associated with a registration target image specified as a target to be registered in the registration unit; a setting unit that performs setting to a setting item according to a type of the association information that is selected by the selecting unit; and a transmitting unit that transmits the registration target image and the association information in which the setting item is set, to the image retrieval device.

Example embodiments of the present invention also provides an information processing system comprising: an image retrieval device, the image retrieval device including a registration unit in which an image and association information are registered in an associated manner, a retrieving unit that retrieves an image that is similar to a retrieval subject image from the registration unit, and a transmitting unit that transmits the association information associated with the retrieved image to a terminal device; and an image processing apparatus, image processing apparatus including an acquiring unit that acquires a registration target image to be registered in the registration unit; a selecting unit that selects the association information to be associated with the registration target image; a setting unit that performs setting to a setting item according to the association information that is selected by the selecting unit; and a transmitting unit that transmits the registration target image and the association information in which the setting item is set, to the image retrieval device.

Example embodiments of the present invention also provides an information processing method implemented in an image processing apparatus that is connected to an image retrieval system via a network, the image retrieval system including a registration unit in which an image transmitted from a terminal device and one or more pieces of association information are registered in an associated manner, a retrieving unit that retrieves an image that is similar to a retrieval subject image from the registration unit, and a transmitting unit that transmits one or more pieces of association information associated with the retrieved image to the terminal device, the information processing method comprising: acquiring a registration target image to be registered in the registration unit; selecting the association information to be associated with a registration target image; performing setting to a setting item according to the association information that is selected at the selecting; and transmitting the registration target image and the association information in which the setting item is set, to the image retrieval device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a diagram illustrating one example of an association-information setting table in which a list of items that can be set for the association information is stored according to the embodiment;

DETAILED DESCRIPTION OF THE PREFERRED EMBODIMENTS

Embodiments of an information processing apparatus, an information processing system, and an information processing method are explained in detail below with reference to the accompanying drawings.

System Applicable to Respective Embodiments

Figure 1:
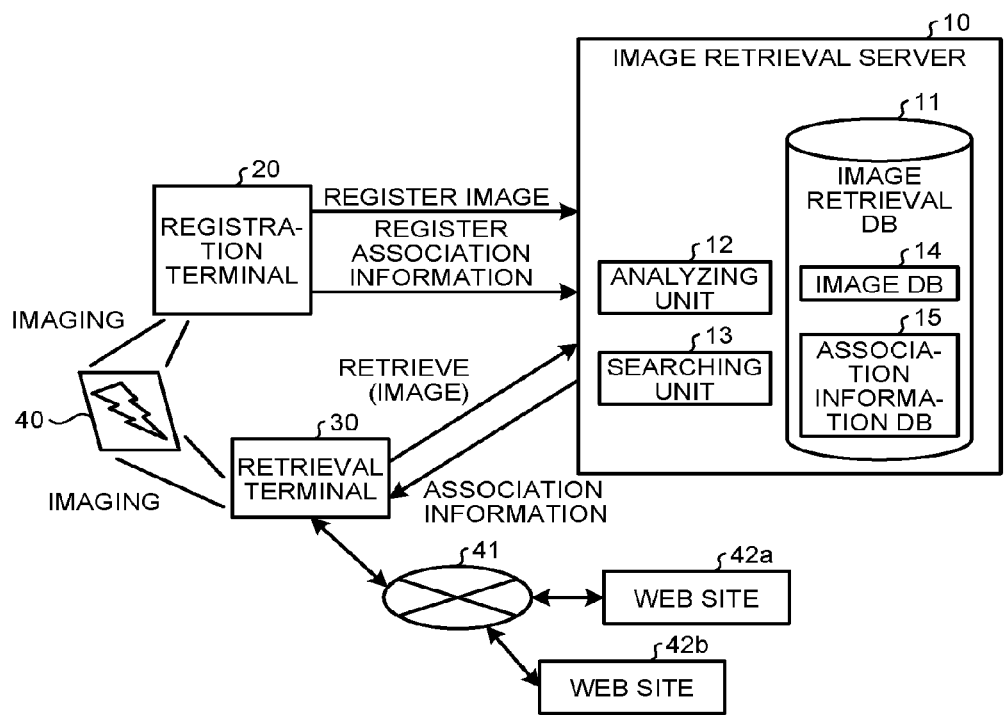
FIG. 1 is a diagram schematically illustrating one example of a configuration of an image retrieval system that is applicable to an embodiment of the present invention.

FIG. 1 is a diagram schematically illustrating one example of a configuration of an image retrieval system that is applicable to respective embodiments. As shown in FIG. 1, the image retrieval system includes an image retrieval server 10, and is capable of communicating with a registration terminal 20 and a retrieval terminal 30 through a network. The image retrieval server 10 may be configured with a single unit of an image processing apparatus, or may be configured with multiple units of information processing apparatuses connected to each other by distributing the functions.

The image retrieval server 10 registers an image and association information that are transmitted from the registration terminal 20, associating with each other. The image retrieval server 10 retrieves an image that is registered in the database based on a captured image in which a subject 40 is imaged and transmitted from the retrieval terminal 30, and transmits association information that is associated with the retrieved image to the retrieval terminal 30.

The image retrieval server 10 includes an analyzing unit 12, a searching unit 13, and an image retrieval database (DB) 11. The image retrieval DB 11 includes an image DB 14 and an association information DB 15. In the image DB 14, images are registered in a retrievable manner. In the association information DB 15, association information to be associated with the image registered in the image DB 14 is registered, associated with the image.

More specifically, the image retrieval server 10 analyzes an image to be a subject of registration by the analyzing unit 12, and extracts feature information expressing features of the image. The image retrieval server 10 stores the extracted feature information in the image DB 14, associating with image identification information to identify the image. Moreover, the image retrieval server 10 stores association information to be provided to a user in the association information DB 15, associating with the image identification information. By storing the image (feature information) and the association information in the image DB 14 and the association information DB 15, respectively, associated with the image identification information, registration of the image into the image retrieval DB 11 is performed.

The registration terminal 20 acquires an image and association information to be associated with the image, and transmits the image and the association information to the image retrieval server 10. The image retrieval server 10 stores the image and the association information transmitted from the registration terminal 20 in the image DB 14 and the association information DB 15 as described above, and performs registration of the image into the image retrieval DB 11.

In the example shown in FIG. 1, the registration terminal 20 uses, as an image to be registered in the image retrieval DB 11, a captured image in which the subject 40 is imaged. It is not limited to this example, and the registration terminal 20 can use, as the image to be registered in the image retrieval DB 11, an image provided externally or an image created inside the registration terminal 20.

The retrieval terminal 30 has an imaging function, and is capable of transmitting an image in which the subject 40 is imaged to the image retrieval server 10 through a network. The retrieval terminal 30 images the subject 40 by activating the imaging function, for example, according to operation by a user, and transmits the image acquired by imaging, and a retrieval request to request retrieval of an image similar to this image, to the image retrieval server 10. The image retrieval server 10 retrieves an image similar to the image from the image DB 14 according to the image and the retrieval request transmitted from the retrieval terminal 30, and outputs the retrieved image and association information as a retrieval result.

For example, the image transmitted from the retrieval terminal 30 is received by the searching unit 13 of the image retrieval server 10. The searching unit 13 transfers the received image to the analyzing unit 12. The analyzing unit 12 analyzes the image transferred from the searching unit 13 to extract feature information from the image, and transfers the extracted feature information to the searching unit 13. The searching unit 13 retrieves, from the image DB 14, feature information having high similarity to the feature information based on the feature information transferred from the analyzing unit 12. The searching unit 13 acquires association information that is associated with the image identification information corresponding to the retrieved feature information, from the association information DB 15, and transmits the association information to the retrieval terminal 30.

The association information may include, for example, a uniform resource locator (URL) of a web site 42*a* or a web site 42*b* on the Internet 41. In this case, the retrieval terminal 30 can access the web site 42*a* or the web site 42*b* through the Internet 41, according to the association information retrieved and transmitted by the image retrieval server 10 based on the captured image in which the subject 40 is imaged.

Figure 2:
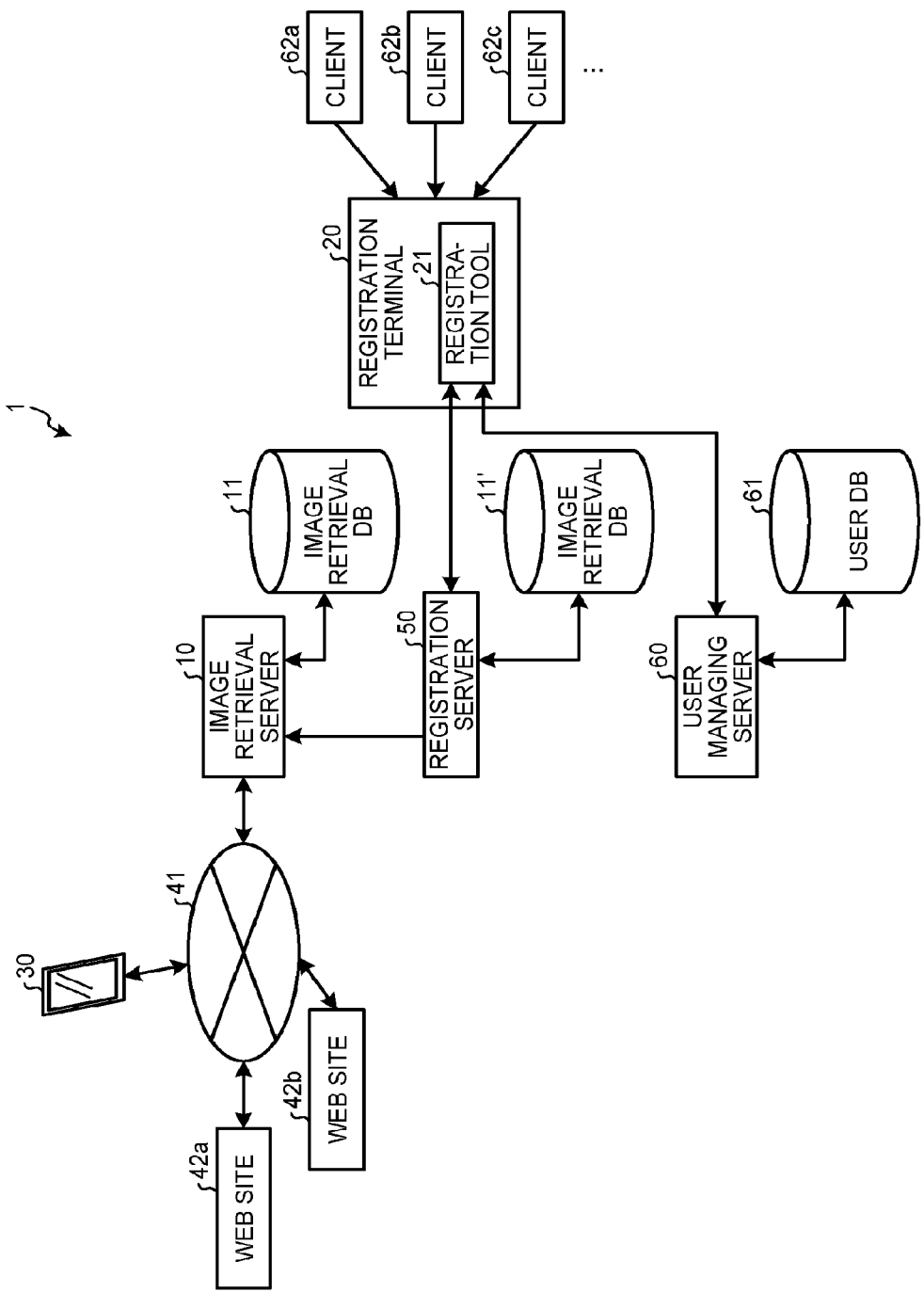
FIG. 2 is a diagram schematically illustrating one example of a configuration of an information processing system according to the embodiment.

FIG. 2 schematically illustrates one example of a configuration of an information processing system according to the respective embodiments. Note that the same reference symbol is given to the common component with FIG. 1 described above, and detailed explanation is omitted.

In FIG. 2, an information processing system 1 includes the image retrieval server 10, the registration terminal 20, and a registration server 50. The information processing system 1 may further include a user managing server 60. In FIG. 2, the image retrieval DB 11 is illustrated so as to be connected externally to the image retrieval server 10 for explanation's sake. Furthermore, the image retrieval DB 11 further includes a metadata DB to store metadata related to an image to be registered in the image DB 14.

In the information processing system 1, registration of an image is performed in a campaign as a unit. In the present invention, a "campaign" indicates any types of event planed by a client such as a campaign advertisement. The campaign includes at least one image, and each association information to be associated to each image, and the metadata includes attribute information of a campaign. Moreover, each image included in a campaign is described as page, appropriately. In other words, the campaign includes an image per page.

As described above, the image retrieval server 10 analyzes an image (captured image) transmitted from the retrieval terminal 30 through the Internet 41 by the analyzing unit 12 to extract feature information, and retrieves feature information similar to the extracted feature information from the image DB 14 by the searching unit 13. The image retrieval server 10 acquires, from the association information DB 15, association information that corresponds to image identification information associated with the feature information retrieved from the image DB 14, to transmit to the retrieval terminal 30.

The registration server 50 includes an image retrieval DB 11' that corresponds to the image retrieval DB 11, and includes the analyzing unit 12 and the searching unit 13, similarly to the image retrieval server 10. Moreover, the image retrieval DB 11' further includes a metadata DB to store metadata that is related to an image included in the image retrieval DB 11'.

The registration terminal 20 includes a registration tool 21. The registration terminal 20 is provided with an image and association information to be associated with the image from each of clients 62*a*, 62*b*, 62*c*, . . . . The registration terminal 20 associates each image provided by the clients 62*a*, 62*b*, 62*c*, . . . with association information, and transmits the image and the association information thereof to the registration server 50. This processing of associating an image provided from the each clients 62*a*, 62*b*, 62*c*, . . . with association information to transmit to the registration server 50 is a processing performed by the registration tool 21 in the registration terminal 20.

The registration server 50 registers the image and the association information transmitted from the registration terminal 20 into the image retrieval DB 11'. That is, the registration server 50 analyzes the image transmitted from the registration terminal 20 by the analyzing unit 12 included in the registration server 50, and extracts, from the image, feature information expressing features of the image. The registration server 50 associates the extracted feature information with image identification information to store in the image DB 14 included in the image retrieval DB 11', and associates the image identification information with association information corresponding to the image stored in the image DB 14 to store in the association information DB 15, thereby performing registration of the image into the image retrieval DB 11'.

The image and the association information stored in the image DB 14 and the association information DB 15 are further associated with metadata including information (user identification (ID) and the like) that indicates a user that has been registered. The user information can be acquired from a user DB 61 described later.

At registration of an image to the registration server 50, the registration terminal 20 can perform similar image check that checks whether or not an image that is similar to the image intended to be registered has already been registered in the registration server 50.

For example, the registration terminal 20 transmits, to the registration server 50, an image that is desired to be checked whether or not a similar image has already been registered. The registration server 50 responds to this request, and analyzes the transmitted image with the analyzing unit 12 to extract feature information. And, the registration server 50 searches the image DB 14 in the image retrieval DB 11' with the searching unit 13 based on the extracted feature information, and transmits a search result to the registration terminal 20. The registration terminal 20 displays for example a message indicating the search result transmitted from the registration server 50 for example on a display to provide the search result. By this message, a user can notify whether or not an image similar to an image of a subject of check has already been registered in the image retrieval DB 11', and can perform modification or correction of the image according to the result.

The registration server 50 transmits an image and association information that are allowed to be open to the public among images (feature information) and association information registered in the image retrieval DB 11' to the image retrieval server 10, to be registered in the image retrieval DB 11. For example, the registration server 50 communicates with the image retrieval server 10 at predetermined timing such as at nighttime, and retrieves an image that is allowed to be open to the public and that is not registered in the image retrieval DB 11 of the image retrieval server 10 yet from among images registered in the image retrieval DB 11' of the registration server 50. The registration server 50 then transmits the retrieved image and association information that is associated with the image to the image retrieval server 10. The image retrieval server 10 registers the image and the association information transmitted from the registration server 50 in the image retrieval DB 11.

The user managing server 60 includes the user DB 61, and manages information of a user that uses the information processing system 1. For example, in the user DB 61, there are registered information about the clients 62a, 62b, 62c, . . . information about a user that can use a function of the registration terminal 20 (the registration tool 21), and information about an administrator that manages the image retrieval server 10 and the registration server 50.

The user managing server 60 manages user information with, for example, four hierarchies of an overall administrator, a domain administrator, a client administrator, and a client. The overall administrator has the authority to access to information of the domain administrator, the client administrator, and the client. The domain administrator has the authority to access to information of the client administrator, and the client, and the client administrator has the authority to access to information of the client. The client has access to only information of each client itself. Each information registered in the user DB 61 is viewed or edited by using the registration tool 21 from the registration terminal 20, according to the authority given to each of the hierarchies.

Figure 3:
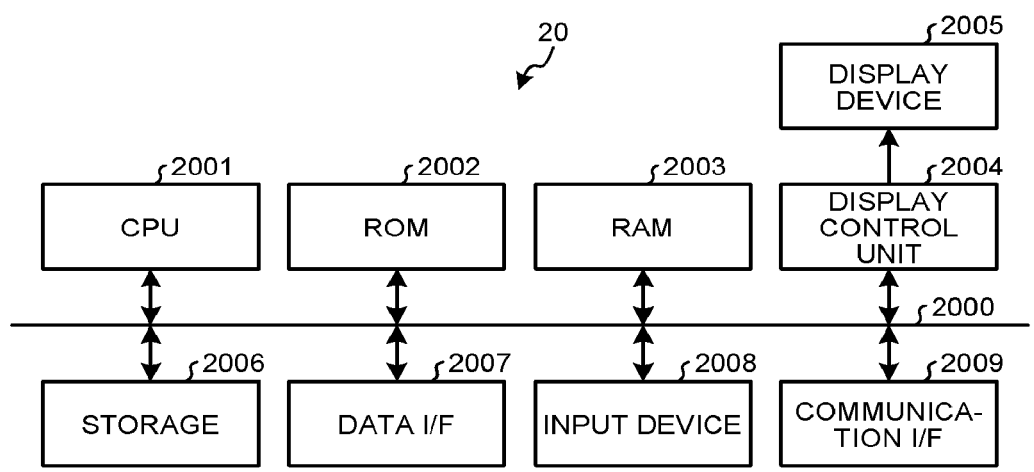
FIG. 3 is a block diagram showing one example of a configuration of hardware of a registration terminal that is applicable to the embodiment.

FIG. 3 illustrates one example of a configuration of hardware of the registration terminal 20 that is applicable to the respective embodiments. In the registration terminal 20 shown in FIG. 3, a central processing unit (CPU) 2001, a read only memory (ROM) 2002, a random access memory 2003, and a display control unit 2004 are connected to a bus 2000. Furthermore, to the bus 2000, a storage 2006, a data interface (I/F) 2007, an input device 2008, and a communication I/F 2009 are connected.

The storage 2006 is a recording medium that can store data in a nonvolatile manner, and for example, a hard disk drive is used. Not limited thereto, but a nonvolatile semiconductor memory such as a flash memory may be used as the storage 2006. In the storage 2006, a program and various kinds of data to be executed by the CPU 2001 are stored.

The CPU 2001 controls the entire registration terminal 20 according to a program stored in the ROM 2002 and the storage 2006, by using the RAM 2003 as a work memory.

The display control unit 2004 converts a display control signal that is generated by the CPU 2001 into a signal displayable by the display device 2005, and outputs the converted display control signal. The display control unit 2004 drives the display device 2005 based on the display control signal generated by the CPU 2001. The display device 2005 is driven by the display control unit 2004 to perform display according to the display control signal.

The data I/F 2007 performs inputting and outputting of data with an external device. As the data I/F 2007, for example, an interface, such as a universal serial bus (USB) and a Bluetooth (registered trademark), can be applied. The communication I/F 2009 performs communication through a network according to control by the CPU 2001 by wireless communication.

The input device 2008 includes, for example, a pointing device such as a mouse, and a keyboard, and accepts an input from a user. The user can provide an instruction to the registration terminal 20 by operating the input device 2008, for example, in response to a display to the display device 2005.

Figure 4:
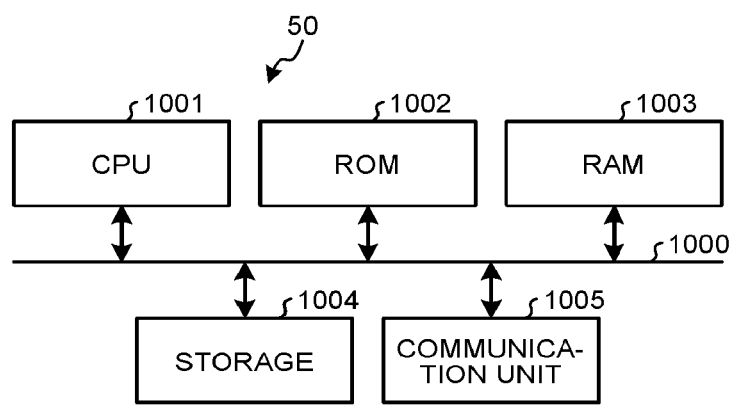
FIG. 4 is a block diagram showing one example of a configuration of hardware of a registration server according to the embodiment.

FIG. 4 illustrates one example of a configuration of hardware of the registration server 50 according to the respective embodiments. In the registration server 50 shown in FIG. 4, a CPU 1001, a ROM 1002, a RAM 1003, a storage 1004, and a communication unit 1005 are connected to a bus 1000. The storage 1004 is a recording medium that can store data in a nonvolatile manner, and is, for example, a hard disk drive. Not limited thereto, a nonvolatile semiconductor memory such as a flash memory may be used as the storage 1004.

The CPU 1001 controls the entire registration server 50 according to a program stored in the ROM 1002 and the storage 1004, by using the RAM 1003 as a work memory.

In the storage 1004, a program and various kinds of data to be executed by the CPU 1001 are stored. Moreover, the image retrieval DB 11' described above is structured using a storage region on this storage 1004. Although the storage 1004 is illustrated to be configured by a single unit of hardware in FIG. 4, it is not limited to this example, but for example, multiple storage devices may be managed compositionally as a single unit of the storage 1004.

The communication unit 1005 includes a communication I/F that performs communication through a network according to control by the CPU 1001 by wireless communication.

Although the registration server 50 is illustrated to be configured with a single unit of hardware in FIG. 4, it is not limited to this example, but the registration server 50 may be configured by controlling multiple units of server devices having equivalent configurations compositionally. Furthermore, the image retrieval server 10 can be implemented by a configuration similar to the registration server 50, and therefore, explanation thereof is omitted herein.

Figure 5:
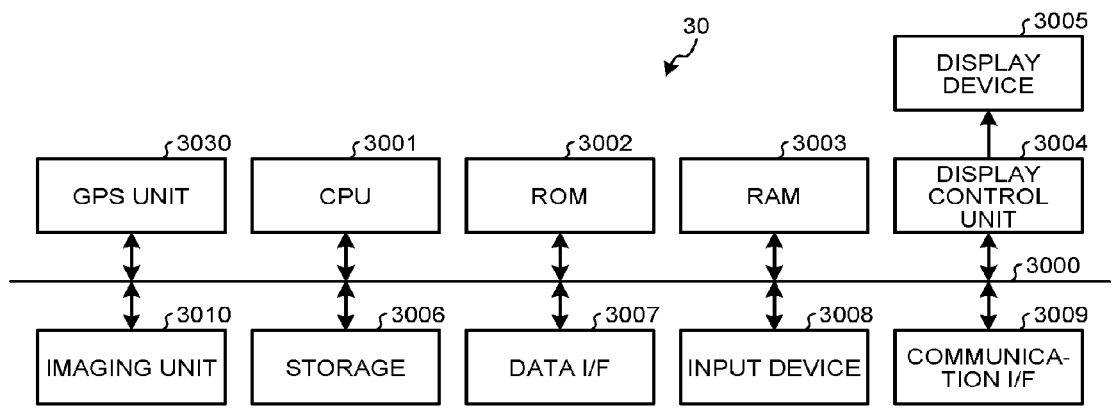
FIG. 5 is a block diagram showing one example of a configuration of hardware of a retrieval terminal that is applicable to the embodiment.

FIG. 5 illustrates one example of a configuration of hardware of the retrieval terminal 30 that is applicable to the respective embodiments. In the retrieval terminal 30 shown in FIG. 5, a CPU 3001, a ROM 3002, a RAM 3003, and a display control unit 3004 are connected to a bus 3000. Moreover, to the bus 3000, a storage 3006, a data I/F 3007, an input device 3008, a communication I/F 3009, an imaging unit 3010, and a global positioning system (GPS) unit 3030 are connected.

The storage 3006 is a recording medium that can store data in a nonvolatile manner, and is, for example, a nonvolatile semiconductor memory such as a flash memory. Not limited thereto, a hard disk drive may be used as the storage 3006. In the storage 3006, a program and various kinds of data to be executed by the CPU 3001 are stored. The storage 3006 and the ROM 3002 may share, for example, one rewritable nonvolatile semiconductor memory, or the like.

The CPU 3001 controls the retrieval terminal 30 according to a program stored in the ROM 3002 and the storage 3006, by using the RAM 1003 as a work memory. The display control unit 3004 converts a display control signal that is generated by the CPU 3001 into a signal displayable by the display device 3005, and outputs the converted display control signal.

The data I/F 3007 performs inputting and outputting of data with an external device. As the data I/F 3007, for example, an interface, such as a USB and a Bluetooth (registered trademark), can be applied.

The display control unit 3004 drives the display device 3005 based on the display control signal generated by the CPU 3001. The display device 3005 includes, for example, a liquid crystal display (LCD), and is driven by the display control unit 3004 to perform displaying according to the display control signal.

The input device 3008 accepts an input from a user. The user can provide an instruction to the retrieval terminal 30 by operating the input device 3008, for example, in response to a displaying to the display device 3005. It is preferable that the input device 3008 and the display device 3005 be unified to be configured as a touch panel that outputs a control signal according to pressing a position and transmits therethrough an image displayed on the display device 3005.

The communication I/F 3009 performs communication via a network according to control by the CPU 3001 by wireless communication.

The imaging unit 3010 includes an optical system, an imaging device, and a control driving circuit for the optical system and the imaging device, and performs predetermined processing on an imaging signal that is output from the imaging device to output as a captured image by a digital signal. The imaging unit 3010 performs functions such as imaging and zooming in accordance with an instruction made by operation of the input device 3008 by a user. The captured image output from the imaging unit 3010 is transmitted to the CPU 3001 through the bus 3000, and is subjected to predetermined image processing according to a program. The captured image output from the imaging unit 3010 and subjected to the image processing can be stored in, for example, the storage 3006. Moreover, the CPU 3001 can read the captured image from the storage 3006 and transmit to a network by the communication I/F 3009.

The GPS unit 3030 receives a signal by GPS, and calculates a current position with latitude and longitude based on the received signal.

Figure 6:
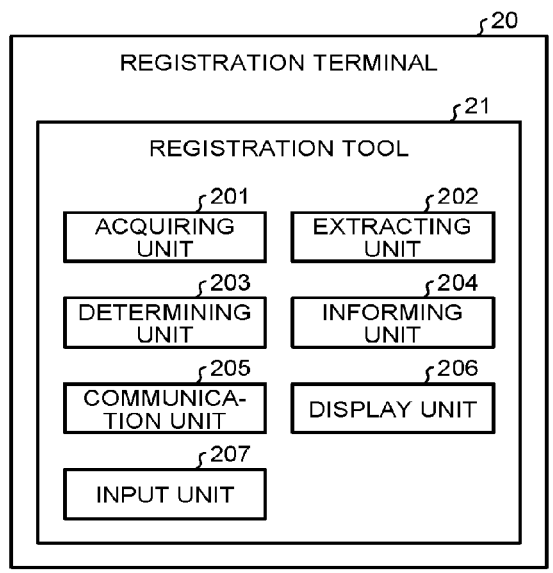
FIG. 6 is one example of a functional block diagram for explaining one example of a function of the registration terminal that is applicable to the embodiment.

FIG. 6 is a functional block diagram for explaining one example of a function of the registration terminal 20 according to the respective embodiments. The registration terminal 20 includes the registration tool 21, and the registration tool 21 includes an acquiring unit 201, an extracting unit 202, a determining unit 203, an informing unit 204, a communication unit 205, a display unit 206, and an input unit 207. These acquiring unit 201, extracting unit 202, determining unit 203, informing unit 204, communication unit 205, display unit 206, and input unit 207 are implemented by a program that operates on the CPU 2001.

The communication unit 205 controls communication through a network, and functions as a transmitting unit that transmits data to the network, and a receiving unit that receives data from the network.

The display unit 206 generates display information to display on the display device 2005. That is, in the registration terminal 20, the CPU 2001 generates a display control signal based on the display information generated by the display unit 206, and transmits the generated display control signal to the display control unit 2004. The display control unit 2004 performs displaying according to the display information on the display device 2005 according to this display control signal. In the following, a series of operation in which display is performed on the display device 2005 according to display information generated by the display unit 206 is described as "the display unit 206 performs displaying", or the like. The input unit 207 accepts information input by input operation to the input device 2008.

The acquiring unit 201 acquires image from an outside of the registration terminal 20. The acquiring unit 201 acquires an image from, for example, the client 62*a*. The acquiring unit 201 may acquire an image that is transmitted from another device that is owned by the client 62*a* through a network, or may receive an image through a recording medium such as a compact disk (CD) and a digital versatile disk (DVD). Furthermore, the acquiring unit 201 may acquire an image from a print medium such as paper. Moreover, the acquiring unit 201 acquires information for association information to be associated with the image, from the client 62*a*.

The extracting unit 202 extracts an image of a predetermined region in the image acquired by the acquiring unit 201. The determining unit 203 determines whether or not an image similar to a part or a whole of the image to be registered in the registration server 50 has already been registered in the registration server 50. The informing unit 204 informs information indicating a result of determination by the determining unit 203.

The acquiring unit 201, the extracting unit 202, the determining unit 203, the informing unit 204, the communication unit 205, the display unit 206, and the input unit 207 included in the registration tool 21 described above are implemented by an information processing program that operates on the CPU 2001. This information processing program is provided, for example, by storing the program in the storage 2006 in advance. Not limited thereto, this information processing program can be configured to be stored in a computer connected to a network and to be provided by being downloaded through the network by the communication I/F 2009. Furthermore, this information processing program may be configured to be provided or distributed through a network.

It is not limited thereto, the information processing program may be stored in a computer-readable recording medium, such as a CD and a DVD, in a file of an installable format or an executable format, to be provided. In this case, the information processing program stored in the recording medium is provided to the registration terminal 20 through, for example, an external drive device that is connected to the data I/F 2007. Not limited thereto, the information processing program stored in the recording medium may be temporarily stored in another information processing apparatus such as a personal computer, and then be provided to the registration terminal 20 by communication through the communication I/F 2009 and the data I/F 2007 from this other information processing apparatus.

The information processing program has, for example, a module structure including the respective components described above (the acquiring unit 201, the extracting unit 202, the determining unit 203, the informing unit 204, the communication unit 205, the display unit 206, and the input unit 207), and as actual hardware, by reading the information processing program from, for example, the storage 2006 and by executing the program by the CPU 2001, the respective components are loaded on a main storage device (for example, the RAM 2003) to be created on the main storage device.

Figure 7:
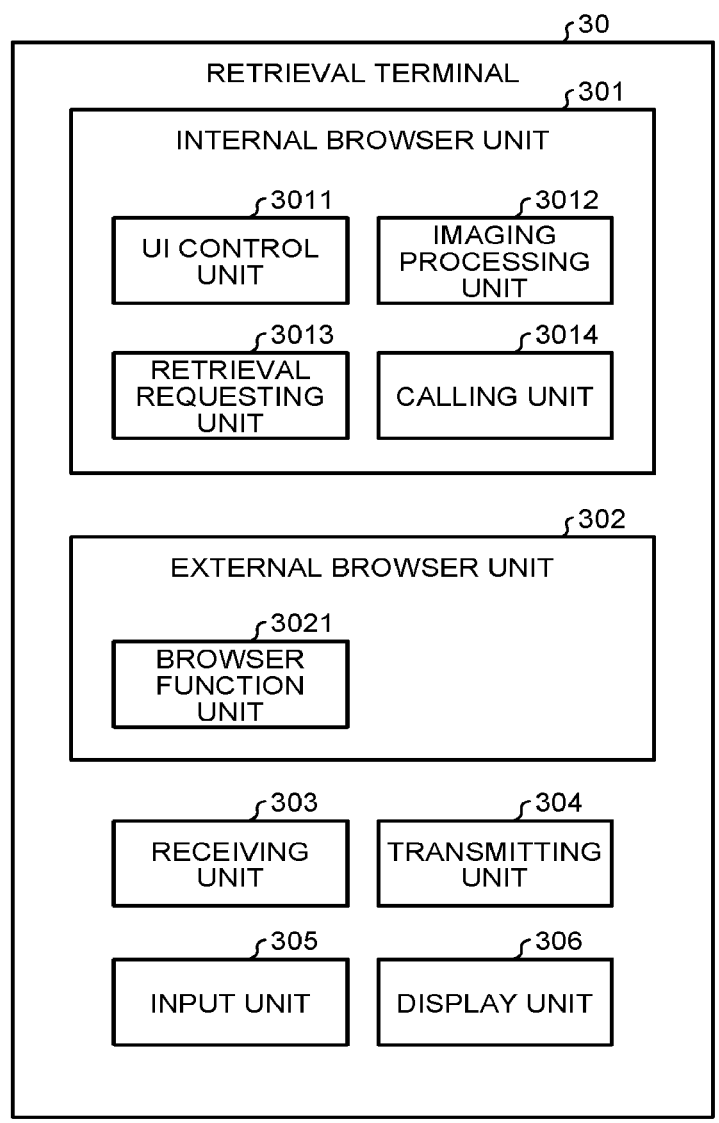
FIG. 7 is one example of a functional block diagram for explaining a function of the retrieval terminal that is applicable to the embodiment.

FIG. 7 is a functional block diagram for explaining a function of the retrieval terminal 30 that is applicable to the respective embodiments. As shown in FIG. 7, the retrieval terminal 30 includes an internal browser unit 301, an external browser unit 302, a receiving unit 303, a transmitting unit 304, an input unit 305, and a display unit 306. The receiving unit 303, the transmitting unit 304, the input unit 305, and the display unit 306 are shared by the internal browser unit 301 and the external browser unit 302.

The receiving unit 303 performs reception processing of data that is transmitted through a network. The transmitting unit 304 performs transmission processing of data through a network. The input unit 305 accepts an input operation to the input device 3008 equipped in the retrieval terminal 30, and acquires data according to the operation. The display unit 306 control display of information for the display device 3005 equipped in the retrieval terminal 30. The input unit 305 and the display unit 306 constitute a user interface of the retrieval terminal 30.

The internal browser unit 301 implements a function corresponding to the information processing system 1, and includes a UI control unit 3011, an imaging processing unit 3012, a retrieval requesting unit 3013, and a calling unit 3014.

The UI control unit 3011 performs control of the respective components (the imaging processing unit 3012, the retrieval requesting unit 3013, and the calling unit 3014) of the internal browser unit 301, and control of the user interface by the internal browser unit 301. That is, the UI control unit 3011 generates display information to be displayed on the display device 3005 to transfer to the display unit 306. Moreover, the UI control unit 3011 performs processing according to an input operation that is accepted by the input unit 305 in response to a displaying by the display unit 306.

The imaging processing unit 3012 activates a camera function equipped in the retrieval terminal 30 and controls the imaging unit 3010 according to control by the UI control unit 3011, to output a captured image. The retrieval requesting unit 3013 creates a retrieval request to request retrieval based on the captured image that is acquired by the imaging processing unit 3012, according to control by the UI control unit 3011, and transmits the generated retrieval request and the captured image to the image retrieval server 10 from the transmitting unit 304. The calling unit 3014 calls the external browser unit 302 according to control by the UI control unit 3011 to perform a function of the external browser unit 302.

The external browser unit 302 includes a browser function unit 3021. The browser function unit 3021 is a browser application equivalent to one equipped in a common computer, and reads a file described according to, for example, the hypertext markup language (HTML), to perform predetermined displaying.

The internal browser unit 301, the external browser unit 302, the receiving unit 303, the transmitting unit 304, the input unit 305, and the display unit 306 are implemented by a program that operates on the CPU 3001. It is not limited thereto, but a part or all of the internal browser unit 301, the external browser unit 302, the receiving unit 303, the transmitting unit 304, the input unit 305, and the display unit 306 may be implemented by hardware that operates in cooperation with each other.

The retrieval terminal 30 may include various kinds of functions in addition to the internal browser unit 301 and the external browser unit 302 described above. For example, the retrieval terminal 30 can include a telephone function and an e-mail function. Furthermore, the retrieval terminal 30 may further include a moving-image reproduction function that supports particularly a video streaming service provided on a predetermined web site on the Internet 41.

The internal browser unit 301 and the external browser unit 302, and the receiving unit 303, the transmitting unit 304, the input unit 305, and the display unit 306 included in the retrieval terminal 30 described above are implemented by programs that operate on the CPU 3001. These programs are provided by storing in, for example, the storage 3006 in advance.

Moreover, among these programs, for example, an internal browser program for implementing the internal browser unit 301 can be configured to be stored in a computer connected to a network, and to be provided by being downloaded by the communication I/F 3009 through the network. This internal browser program may also be configured to be provided and distributed through a network.

It is not limited thereto, the internal browser program may be provided by storing in a computer-readable recording medium, such as a CD and a DVD, in a file in an installable format or an executable format. In this case, the internal browser program stored in the recording medium is provided to the retrieval terminal 30 through an external drive device that is connected to the data I/F 3007, for example. Not limited thereto, the internal browser program stored in the recording medium may be temporarily stored in another information processing apparatus such as a personal computer, and then be provided from this other information processing apparatus to the retrieval terminal 30 by communication through the communication I/F 3009 and the data I/F 3007.

The internal browser program has, for example, a module structure including the respective components described above (the UI control unit 3011, the imaging processing unit 3012, the retrieval requesting unit 3013, and the calling unit 3014), and as actual hardware, by reading the internal browser program from, for example, the storage 3006 and by executing the program by the CPU 3001, the respective components are loaded on a main storage device (for example, the RAM 3003) to be created on the main storage device.

Image Registration Processing According to Respective Embodiments

Figure 8:
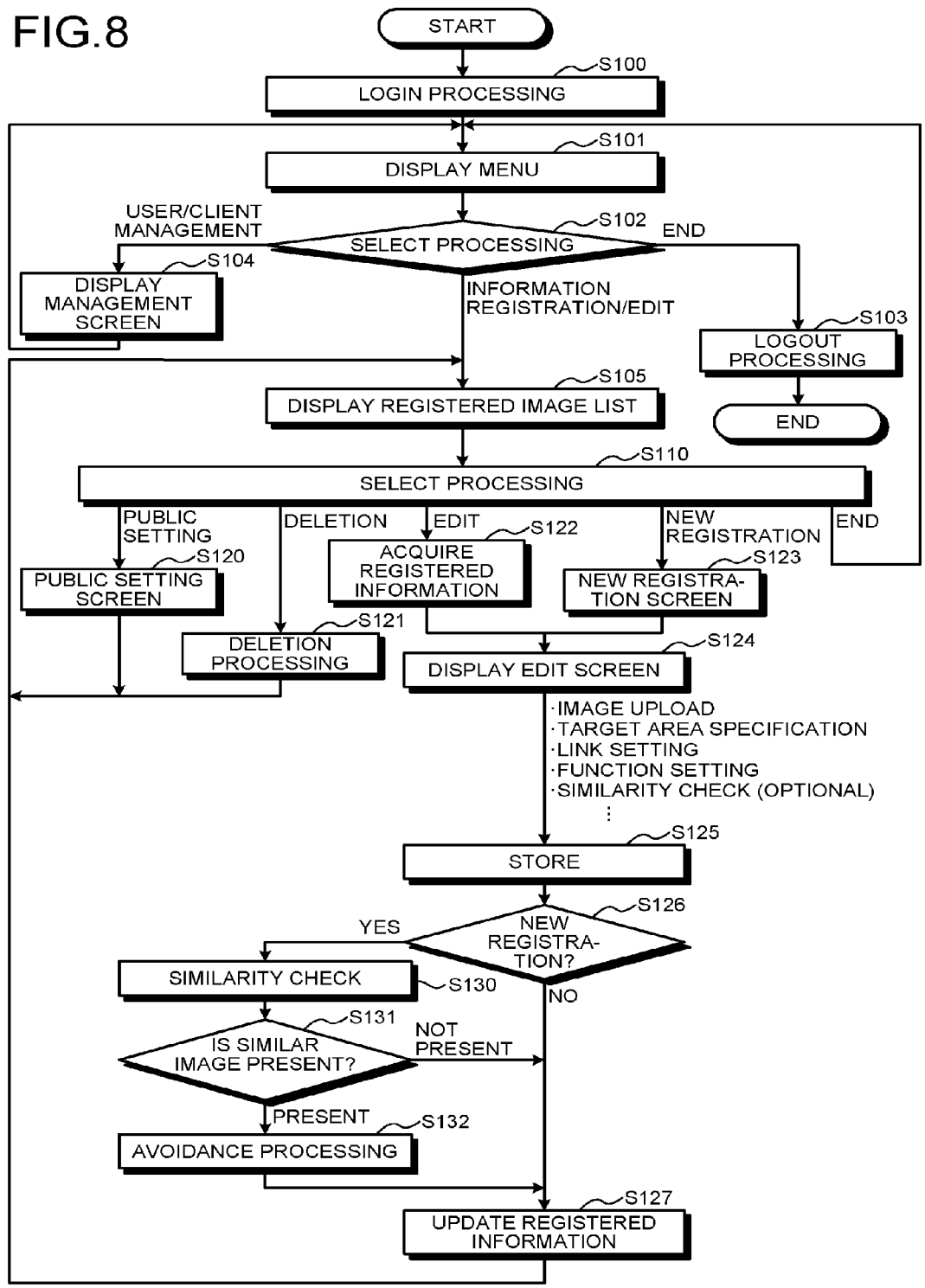
FIG. 8 is a flowchart showing one example of image registration processing that is performed by a registration tool in the registration terminal according to the embodiment.

Next, image registration processing according to the embodiment is explained. FIG. 8 is a flowchart showing one example of the image registration processing that is performed by the registration tool 21 in the registration terminal 20 according to the respective embodiments. Prior to the processing in the flowchart of FIG. 8, information of a user (a user ID and a password) that uses the registration tool 21 has been registered in the user DB 61 by the user managing server 60. Moreover, in the following, an image is registered in a campaign as a unit.

Figure 9:
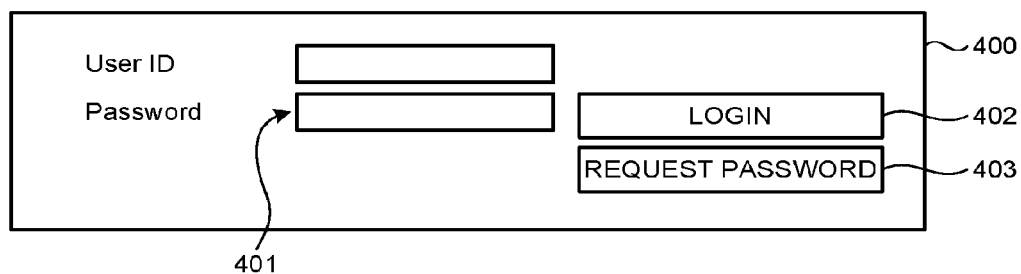
FIG. 9 is a diagram illustrating an example of a login screen according to the embodiment.

When the registration tool 21 is activated in the registration terminal 20, the registration tool 21 performs login processing for the user at step S100. For example, the registration tool 21 performs display of a login screen 400 exemplified in FIG. 9 with the display unit 206. In the example in FIG. 9, in the login screen 400, an input section 401 to input user information (a user ID and a password), a button 402 to instruct login, and a button 403 to request reissuance of a password are arranged.

For example, when a user ID and a password are input to the input section 401, the registration tool 21 transmits the user ID and the password to the user managing server 60, and request verification of the user ID. When receiving information indicating that the verification of the user ID is successful, the registration tool 21 shifts the processing to step S101.

Figure 10:
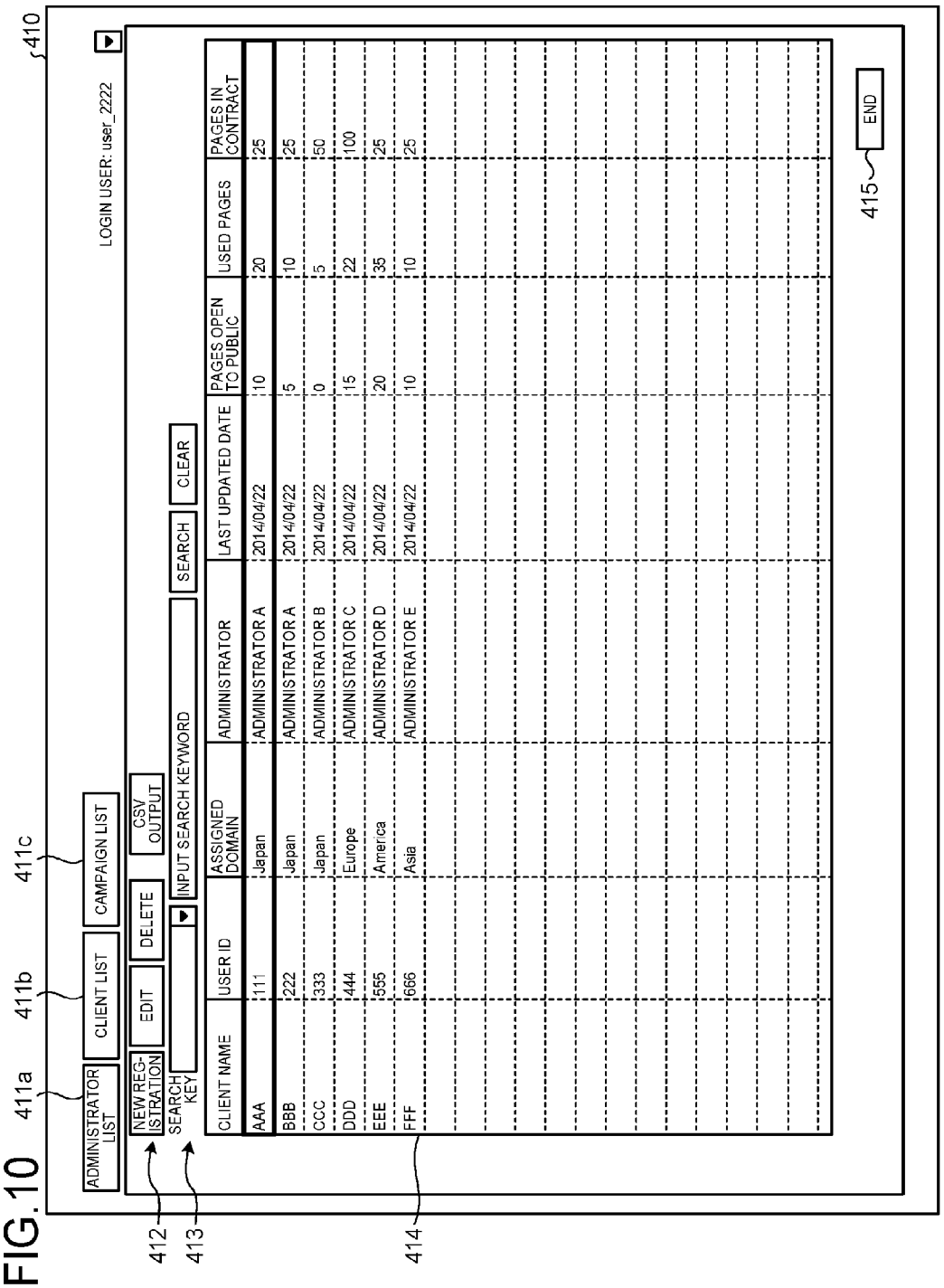
FIG. 10 is a diagram illustrating an example of a menu screen according to the embodiment.

At step S101, the registration tool 21 performs display of a menu screen 410 exemplified in FIG. 10 with the display unit 206. In the example shown in FIG. 10, in the menu screen 410, tubs 411a, 411b, and 411c, a button group 412, a search input section 413, a list display area 414, and an end button 415 are arranged.

The tabs 411a, 411b, and 411c are tabs to select a menu item and determine an operation mode of the registration tool 21. The tabs 411a and 411b are tabs to shift to a user managing mode, and by operating the tabs 411a and 411b, an administrator list and a client list are displayed, respectively. Furthermore, the tab 411c is a tab to shift to an image registration mode, and by operating the tab 411c, a campaign list is displayed.

In a list display area 414, a list corresponding to a menu item that is selected in the tubs 411a, 411b, and 411c is displayed. In the example shown in FIG. 10, the tab 411b is operated and a client list is selected. In the following, each line is called record, and each column is called item.

The button group 412 selects processing for a list displayed in the list display area 414. In the example shown in FIG. 10, the button group 412 includes four buttons, and to the respective buttons, functions of "new registration", "edit", "delete", and "comma-separated values (CSV) output" are assigned, respectively, from left. The "new registration" button is to add a new record to the list displayed in the list display area 414. The "edit" button is to edit information of a record that is selected in the list displayed in the list display area 414. The "delete" button is to delete information of a record that is selected in the list displayed in the list display area 414. The "CSV output" is to output information of the list displayed in the list display area 414 in a text file in the CSV format.

With the search input section 413, a record is selected from the list displayed in the list display area 414 based on a selected or input search key. The end button 415 is to end the processing by the registration tool 21.

Explanation returns to FIG. 8, and when a menu is displayed at step S101, the processing shifts to following step S102, and the registration tool 21 waits until either of the tabs 411a, 411b, and 411c and the end button 415 is operated to select a processing. When the end button 415 is operated, the registration tool 21 shifts the processing to step S103, and performs log-out processing of the user, to end the operation of the registration tool 21.

Moreover, at step S102, when the tab 411a or the tab 411b is operated to select the user managing mode, the registration tool 21 shifts the processing to step S104. At step S104, the registration tool 21 performs display of either an administrator list screen or a client list screen according to which one out of the tabs 411a and 411b is operated at step S102. The registration tool 21 returns, when an operation indicating completion of the processing on the administrator list screen or the client list screen is performed, the processing to step S101, and performs menu displaying.

Figure 11:
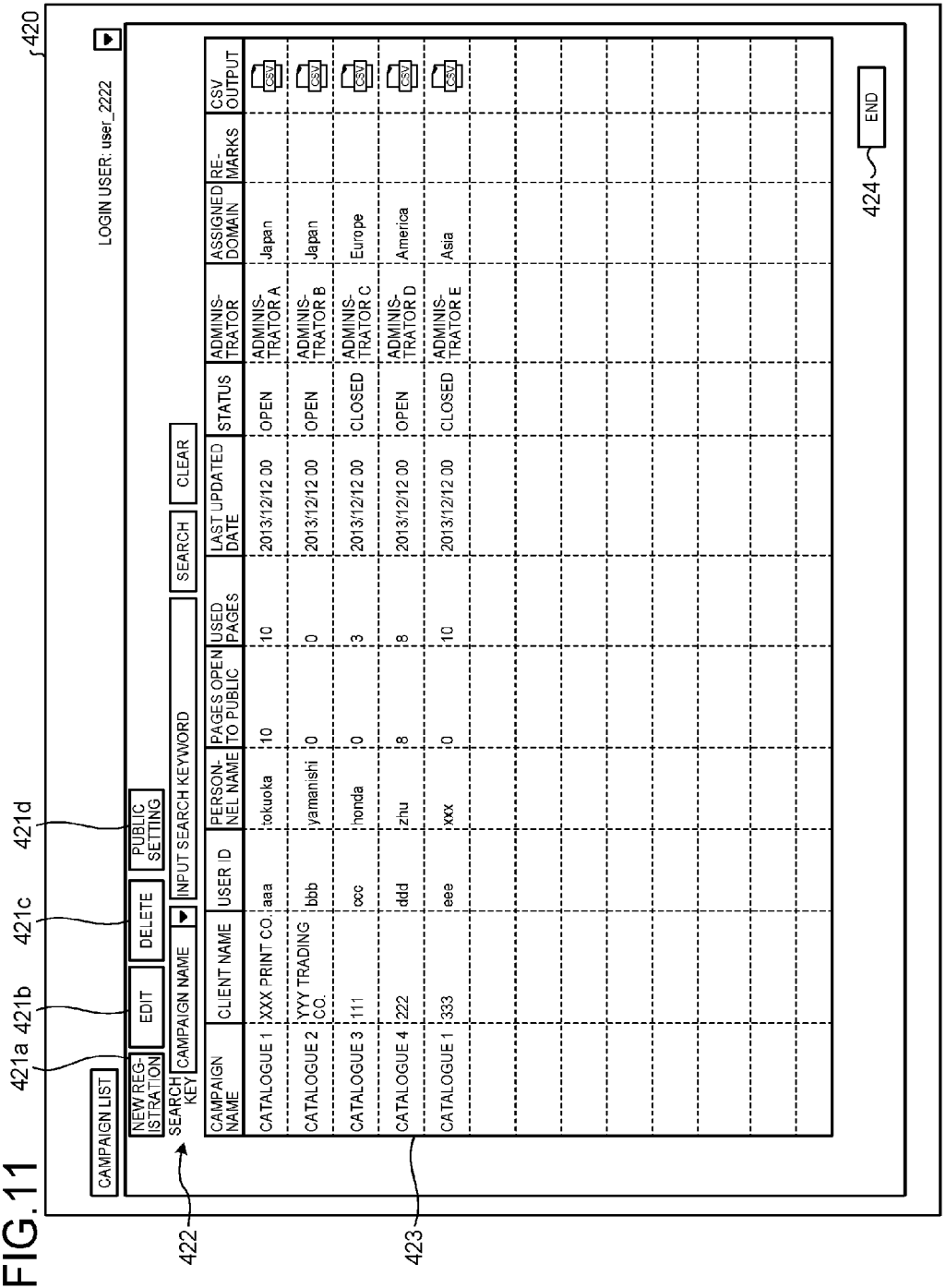
FIG. 11 is a diagram illustrating an example of a registration-information list screen according to the embodiment.

Furthermore, at step S102, when the tab 411c is operated to select the image registration mode, the registration tool 21 shifts the processing to step S105. At step S105, the registration tool 21 performs displaying of a registered-information list screen 420 as exemplified in FIG. 11 by the display unit 206, and waits an operation by the user. As shown in FIG. 11, in the registered-information list screen 420, buttons 421a to 421d, a search input section 422, a list display region 423, and an end button 424 are arranged.

In the list display region 423, a list of campaigns registered in the registration server 50 is displayed. At this time, the registration tool 21 can select a campaign accessible for the user that is logged in to the registration tool 21 from among the campaigns registered in the registration server 50, to display in the list display region 423. For example, the registration tool 21 acquires information relating to the user that is logged in from the user managing server 60, and acquires, based on this information, a list of campaigns accessible for the user from the metadata DB of the registration server 50.

The button 421a is a "new registration" button to add a new record to the list displayed in the list display region 423. The button 421b is an "edit" button to edit information of a record that is selected in the list displayed in the list display region 423. The button 421c is a "delete" button to delete information of a record that is selected in the list displayed in the list display region 423. Moreover, the button 421d is a button to set open or closed for a campaign registered in a record that is selected in the list displayed in the list display region 423.

In the example shown in FIG. 11, each record includes respective items of "campaign name", "client name", "user ID", "personnel name", "pages open to public", "used pages", "last updated date", "status", "administrator", "assigned domain", "remarks", and "CSV output". Information of a record is metadata of a campaign indicated in the record, and is stored, for example, in the metadata DB included in the image retrieval DB 11' in the registration server 50.

A record is created per a campaign unit, and is associated with at least one image included in one campaign, and is created, for example, based on metadata registered in the metadata DB. The registration tool 21 can acquire information of a record that is displayed in the list display region 423 from the metadata DB included in the image retrieval DB 11' of the registration server 50.

In each record in the list displayed in the list display region 423, the item "campaign name" indicates a name given to a campaign registered in the record. The item "client name" indicates an owner of the campaign of the record. The item "user ID" indicates an ID of the owner of the campaign of the record. The item "personnel name" indicates a user name that has input information of the campaign of the record.

The item "pages open to public" indicates the number of open pages that are set to be open out of pages included in the campaign of the record. For example, pages specifying a target area described later are the open pages. The item "used pages" indicates the total number of pages included in the campaign of the record. That is, the number of pages indicated in the item "used pages" is shown even if the campaign of the record is in a closed state. A record for which both the items "pages open to public" and "used pages" are set to "0" indicates that only campaign information has been registered but no images have been registered yet.

The item "last updated date" indicates date when the information of the campaign is edited last. The item "status" indicates whether the campaign of the record is in the open state or the closed state. The item "administrator" indicates an administrator superior to the user in charge of the campaign of the record. The item "assigned domain" indicates information of domain to which the administrator belongs. In the item "remarks", arbitrary information can be input. Moreover, with the item "CSV output", information of the record is output in a text file in the CSV format.

When the registered-information list screen 420 is displayed at step S105, the registration tool 21 shifts the processing to next step S110, and waits for an operation to the buttons 421a to 421d, and the end button 424. In the following, processing according to an operation to the respective buttons is explained according to the following items (1) to (5).

(1) When the button 424 to instruct termination of the processing is operated at step S110, the registration tool 21 returns the processing, for example, to step S101 and performs menu displaying.

(2) When the button 421d to make settings of open or closed for a campaign is operated in a state in which a record is selected in the list display region 423 at step S110, the registration tool 21 shifts the processing to step S120. At step S120, the registration tool 21 performs display of a public setting screen to make settings of open and closed to the public of a campaign indicated in the selected record by the display unit 206.

Figure 12:
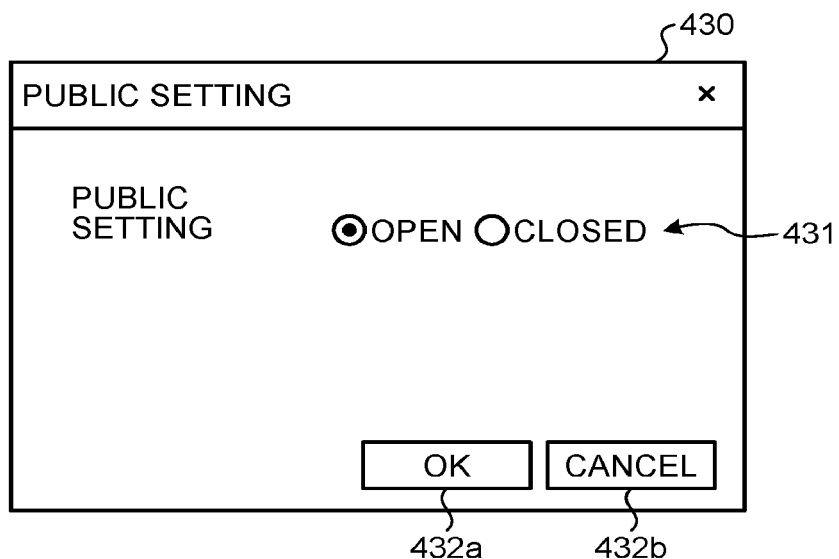
FIG. 12 is a diagram illustrating an example of a public setting screen according to the embodiment.

FIG. 12 illustrates an example of the public setting screen. As shown in FIG. 12, in a public setting screen 430, a public setting unit 431, an OK button 432a, and a cancel button 432b are arranged. In the example shown in FIG. 12, the public setting unit 431 can exclusively set to open or closed by a radio button, and a value of an item "public status" of a selected record is to be an initial value. When the OK button 432a is operated, the registration tool 21 sets, to the record, a public status that has been set to either open or closed in the public setting unit 431. When the public status is set, the registration tool 21 updates the display of the list display region 423, and returns the processing to step S105. Furthermore, when the cancel button 432b is operated, the registration tool 21 sets the public status of the record to a status before display of the public setting screen 430, and returns the processing to step S105.

(3) When the button 421c to instruct deletion of an image is operated in a state in which a record is selected in the list display region 423 at step S110, the registration tool 21 shifts the processing to step S121. At step S121, the registration tool 21 deletes information of the selected record. At this time, it is preferable that the registration tool 21 display a confirmation screen to confirm whether to delete the record really, whether to delete the record including information of the image that is associated with the record, or the like. When the record is deleted, the registration tool 21 updates the display of the list display region 423, and returns the processing to step S105.

(4) When the button 421b to instruct edit of an image is operated at step S110, the registration tool 21 shifts the processing to step S122. At step S122, the registration tool 21 acquires, from the registration server 50, an image that is included in a campaign indicated in the selected record in the list displayed in the list display region 423 of the registered-information list screen 420. When association information is associated with the acquired image, the registration tool 21 acquires this association information also. The registration tool 21 then shifts the processing to step S124.

(5) Furthermore, when the button 421a to instruct new registration is operated at step S110, the registration tool 21 shifts the processing to step S123, and performs registration processing for a new campaign. At step S123, the registration tool 21 performs displaying of a campaign registration screen 440 as exemplified in FIG. 13 to perform new registration processing of a campaign.

Figure 13:
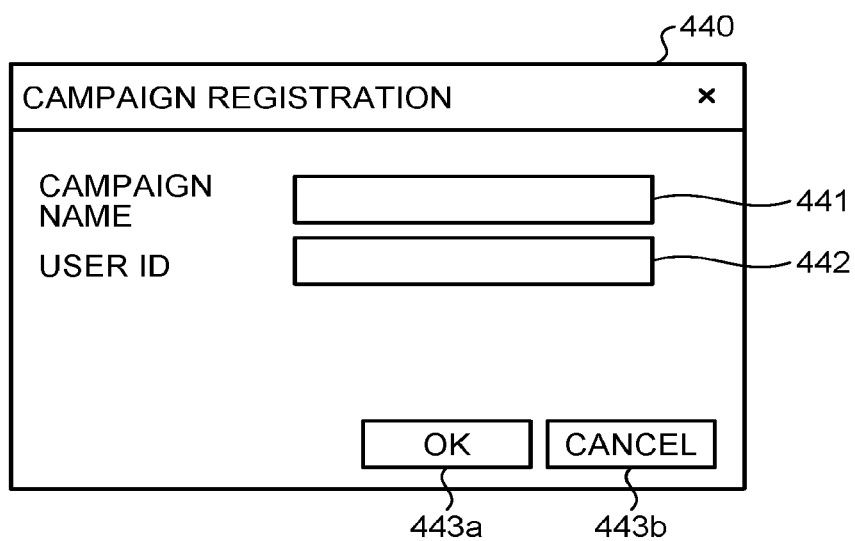
FIG. 13 is a diagram illustrating an example of a campaign registration screen according to the embodiment.

As shown in FIG. 13, in the campaign registration screen 440, input sections 441 and 442 to input a campaign name and a user ID, an OK button 443a, and a cancel button 443b are arranged. A character string input to the input section 441 is to be a value of the item "campaign name" of the record. Similarly, a character string input to the input section 442 is to be a value of the item "user ID" of the record.

When the OK button 443a is operated, the registration tool 21 sets the respective character strings input to the input sections 441 and 442 in the campaign registration screen 440 as the items "campaign name" and "user ID" of the record, and shifts the processing to step S124.

Figure 14:
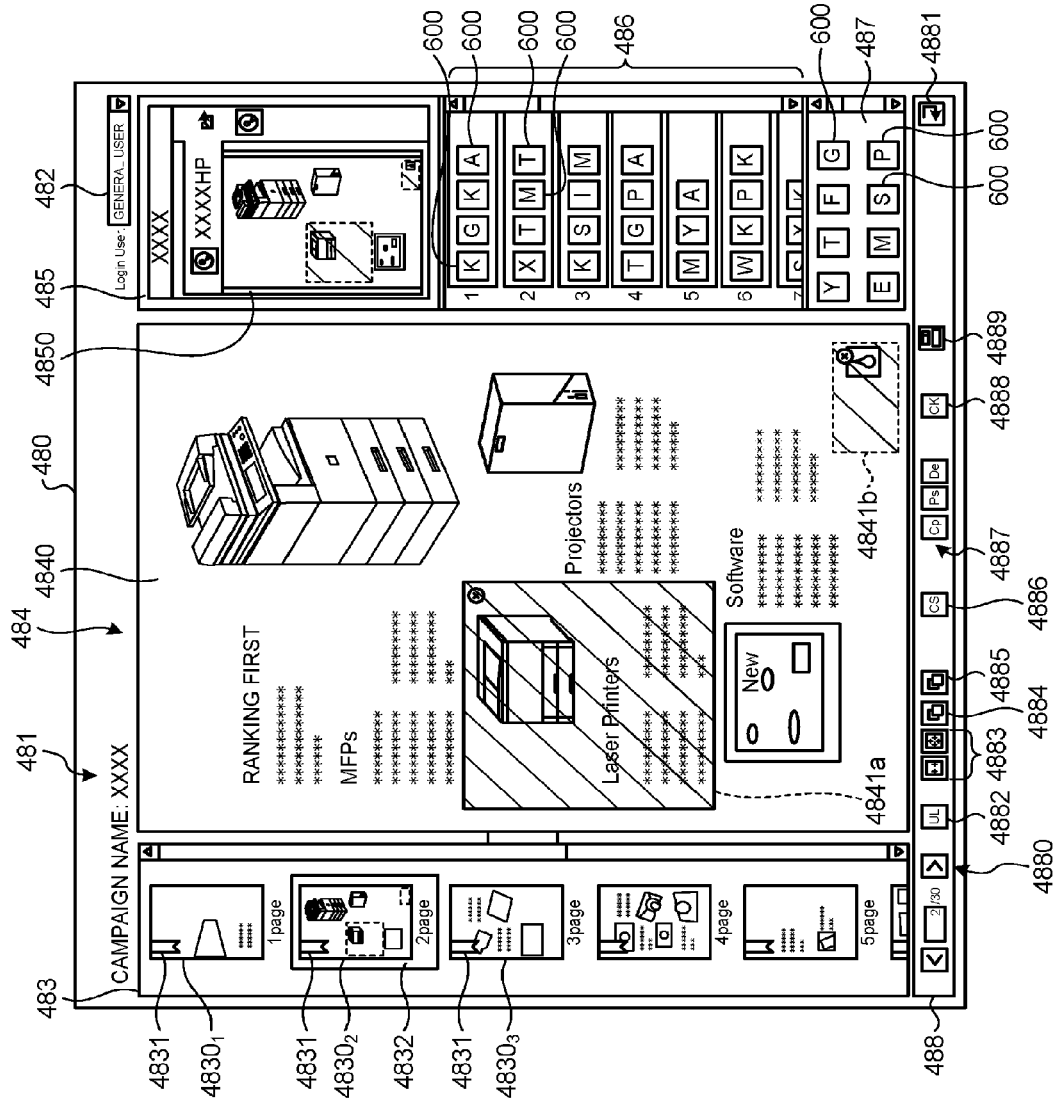
FIG. 14 is a diagram illustrating an example of an edit screen according to the embodiment.

At step S124, the registration tool 21 performs display of an edit screen to edit information of a campaign with the display unit 206. FIG. 14 illustrates an example of the edit screen. As shown in FIG. 14, an edit screen 480 includes a header region 481, a thumbnail display region 483, a page edit region 484, a preview region 485, a target-area list region 486, a link-icon list region 487, and a tool bar 488.

In the header region 481, a name of a campaign (a campaign name) to be a subject of edit of this edit screen 480 is displayed at a left end, and a user-menu display section 482 in which a menu that can be used with the authority of a user that is logged into the registration tool 21 is arranged at a right end.

The thumbnail display region 483 is a region in which thumbnail images that are miniaturized images of respective images included in the campaign are displayed. For example, when the processing is shifted from step S122 described above at which edit of campaign information is instructed to this step S124, the registration tool 21 acquires each image that is acquired at step S122 from the registration server 50, and that is included in the campaign indicated by the record selected from the list display region 423, from the image DB 14 of the registration server 50. The registration tool 21 then miniaturizes each of the acquired images to create thumbnail images, and displays the thumbnail images in the thumbnail display region 483. In the example shown in FIG. 14, in the thumbnail display region 483, thumbnail images $4830_1$, $4830_2$, $4830_3$, . . . are displayed.

When the processing is shifted from step S123 described above at which new registration of campaign information is instructed to this step S124, the thumbnail display region 483 is to be blank. Moreover, by operating a scroll bar that is provided at a right end of the thumbnail display region 483, other thumbnail images that are virtually displayed outside of the thumbnail display region 483 can be sequentially displayed inside the thumbnail display region 483.

In the page edit region 484, an image 4840 to be a subject of edit out of the respective images included in the campaign is displayed. For example, the registration tool 21 displays original images of thumbnail images that are selected from among the respective thumbnail images $4830_1$, $4830_2$, $4830_3$, . . . in the page edit region 484 as the image 4840. In the example shown in FIG. 14, the thumbnail image $4830_2$ is selected in the thumbnail display region 483, and the original image of this selected thumbnail image $4830_2$ is displayed in the page edit region 484 as the image 4840. Furthermore, in the thumbnail display region 483, the thumbnail image $4830_2$ that is selected and currently displayed in the page edit region 484 is displayed in an emphasized manner by a frame 4832 therearound.

If a range is specified for the image 4840 displayed in the page edit region 484, the registration tool 21 can set the specified range as a subject region. Specification of a range is achieved, for example, by the input unit 207 accepting an operation to the input device 2008 made by a user. For example, by specifying arbitrary two points in the image 4840 displayed in the page edit region 484, a rectangular area having the specified two points as points on a diagonal line is specified. In the example shown in FIG. 14, target areas 4841a and 4841b are set with rectangular areas in the image 4840 in the page edit region 484, respectively.

The registration tool 21 can show the set target areas 4841a and 4841b explicitly, for example, by displaying the set target areas 4841a and 4841b by differing color inside the areas from that outside the areas. Moreover, the shape of a target area is not limited to rectangle, but an arbitrary shape can be set as long as it has a closed shape.

The registration tool 21 generates identification information (serial numbers, and the like) to identify the set respective target areas 4841a and 4841b, to associate with the respective target areas 4841a and 4841b. The identification information is generated so that a target area can be identified through respective images included in a campaign being a target of edit.

Furthermore, details are described later but the registration tool 21 can associate at least one piece of association information with the target areas 4841a and 4841b that are set in the page edit region 484.

Moreover, the registration tool 21 adds a marker image 4831 to a thumbnail image that is subjected to any kind of edit, for example, specification of a target area, in the page edit region 484 and that corresponds to an image that has not been saved, out of the respective thumbnail images $4830_1$, $4830_2$, $4830_3$, . . . .

The preview region 485 displays a preview screen 4850 that emulates a screen in which the image that is being edited in the page edit region 484 is displayed on the display device 3005 of the retrieval terminal 30 by an application program supporting this information processing system 1. The registration tool 21 displays, in the preview region 485, the respective target areas 4841a and 4841b that have been set in the page edit region 484 explicitly by emphasized display or the like. Furthermore, the registration tool 21 displays information indicating the association information that has been set for the respective target areas 4841a and 4841b, in the preview region 485 in correspondence to the respective target areas 4841a and 4841b.

In the target-area list region 486, a list of association information that is added to the respective target areas set for the respective images included in the campaign being a target of edit with icon images 600, 600, . . . . In the example shown in FIG. 14, the registration tool 21 displays the association information collectively per identification information (serial number) that is added to corresponding target area, in the target-area list region 486. Furthermore, by operating a scroll bar provided at a right end in the target-area list region 486, association information of other target areas that are virtually displayed outside of the target-area list region 486 can be displayed sequentially to appear inside the target-area list region 486.

In the link-icon list region 487, association information that can be set for target areas is listed using the icon images 600, 600, . . . that correspond to the respective association information. The registration tool 21 moves the icon image 600 displayed in the link-icon list region 487 by so-called drug and drop operation, and overlaps the icon image 600 on, for example, the target area 4841a set in the page edit region 484, thereby associating the association information corresponding to the icon images 600, 600, . . . with the target area 4841a. Moreover, more than one piece of association information can be associated with one target area. That is, the registration tool 21 functions as a selecting unit that selects association information to be associated with a target area.

In the link-icon list region 487, by operating a scroll bar provided at a right end, the other icon images 600 that are virtually arranged outside the link-icon list region 487 can be sequentially displayed to appear inside the link-icon list region 487.

When association information is associated with a target area, the icon image 600 indicating the associated association information can be displayed at a predetermined position of the target area. By virtue of this configuration, it can be preferably informed associated information which is associated with the target area 4841a. Furthermore, association of association information with a target area is reflected to a display in the preview region 485.

In the tool bar 488, a page specifying unit 4880 to specify a page (image) that is displayed in the page edit region 484, and a button or button groups 4881 to 4889 to perform various kinds of functions included in the registration tool 21 are arranged. The button 4881 is a button to return to the registered-information list screen 420 from the edit screen 480.

Figure 15:
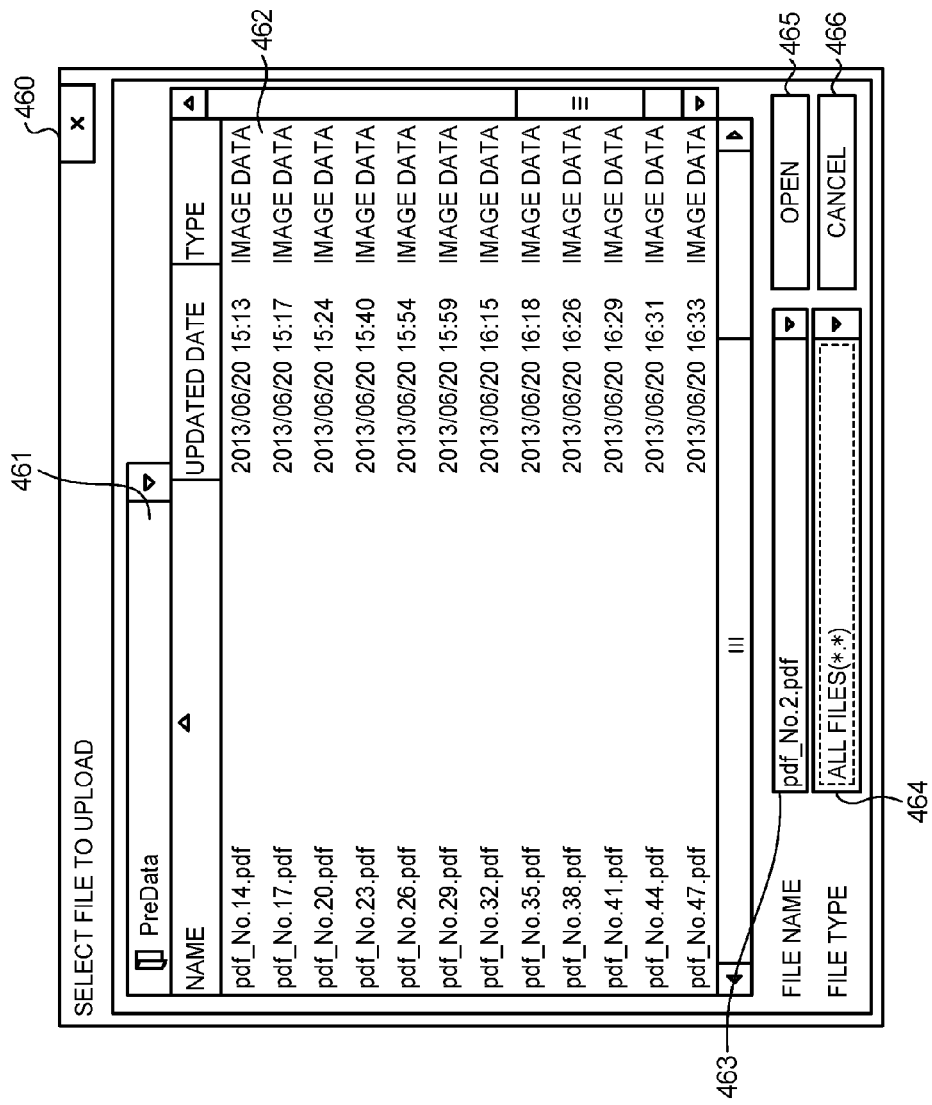
FIG. 15 is a diagram illustrating an example of a file selecting screen according to the embodiment.

The button 4882 is a button to upload an image to the registration server 50 from the registration terminal 20. When the button 4882 is operated, the registration tool 21 performs display of, for example, a file selecting screen 460 as exemplified in FIG. 15 with the display unit 206. In FIG. 15, for example, the file selecting screen 460 is a standard file selecting screen that is provided, for example, by an OS that operates on the CPU 2001 of the registration terminal 20, and a folder specifying section 461, a file-list display region 462, a file-name display section 463, a file-format specifying section 464, buttons 465 and 466 are arranged therein.

The file-list display region 462 displays a list of files that are stored in a folder that is specified at the file specifying section 461. The file-format specifying unit 464 specifies a format of a file to be displayed in the file-list display region 462. The file-name display section 463 displays a file name of the file selected in the file-list display region 462. By selecting at least one file from among files displayed in the file-list display region 462 to operate the button 465, for example, information indicating the selected file is transferred from the OS to the registration tool 21. The registration tool 21 transmits the file indicated in the file information transferred from the OS from the registration terminal 20 to the registration server 50, to perform upload of the image to the registration server 50. The button 466 is used when returning to the edit screen 480 without performing upload of a file.

Returning back to explanation of FIG. 14, the button group 4883 includes two buttons for adjusting the display size of the image 4840 that is displayed in the page edit region 484.

The button 4884 switches to a target-area setting mode in which a target area is set from the area setting mode in which an area is set in the page edit region 484. When an area is set in the image 4840 that is displayed in the page edit region 484 in a state in which this button 4884 is operated to switch to the target-area setting mode from the edit mode, the registration tool 21 sets the area to the target area.

The button 4885 switches to a mask setting mode in which a mask area that is not to be a subject of extraction of feature information by the analyzing unit 12 is specified, from the area setting mode in which an area is specified in the page edit region 484. When an area is specified in the image 4840 that is displayed in the page edit region 484 in a state in which this button 4885 is operated to switch to the mask setting mode from the edit mode, the registration tool 21 sets the area to the mask area.

Figure 16:
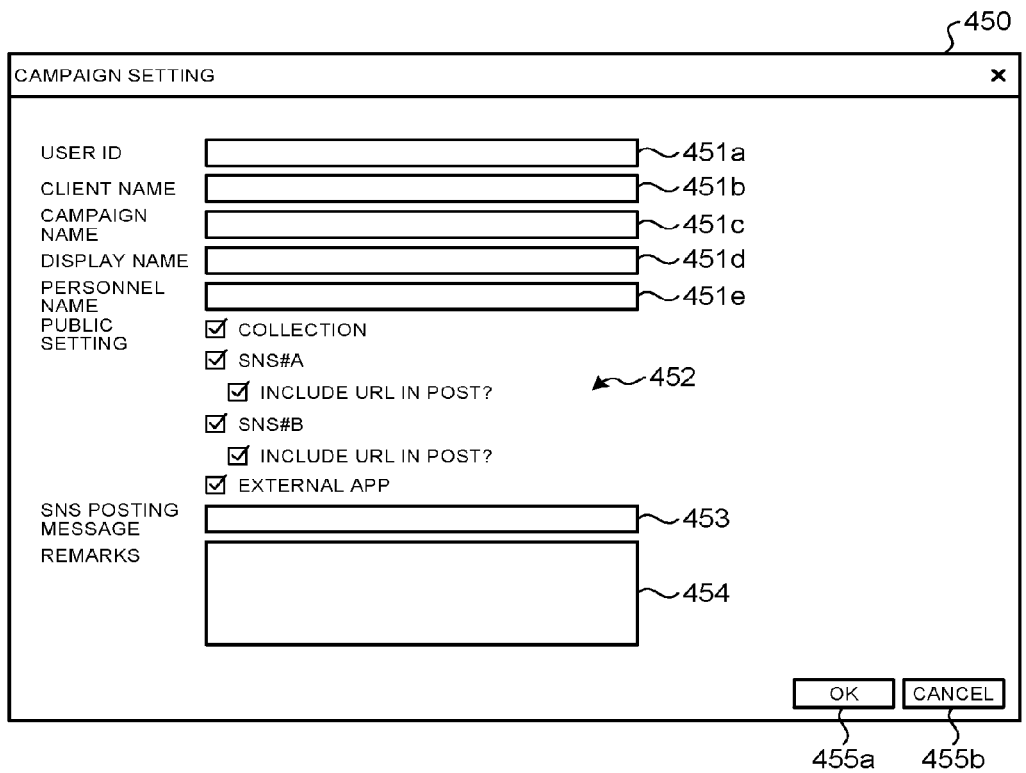
FIG. 16 is a diagram illustrating an example of a campaign setting screen according to the embodiment.

The button 4886 is a button to display a campaign setting screen to set details of a campaign. FIG. 16 illustrates an example of the campaign setting screen. As shown in FIG. 16, in a campaign setting screen 450, display areas 451*a* and 451*b*, input areas 451*c* to 451*e*, 453, and 454, a public-method setting section 452, and buttons 455*a* and 455*b* are arranged. In the display regions 451*a* and 451*b*, values of the items "user ID" and "client name" of the record in the registered-information list screen 420 shown in FIG. 11 are displayed in an invariable manner.

In the input region 451*c*, a campaign name is input. In the input region 451*c*, a value of the item "campaign name" of the record in the registered-information list screen 420 is input by default. In the input region 451*d*, a display name that is used when the campaign is displayed in the retrieval terminal 30 is input. In the input region 451*e*, for example, a name of a personnel that performs registration of the campaign is input.

The public-method setting section 452 sets a method by which a campaign is open to the public. Opening to the public herein corresponds to an action at the retrieval terminal 30 when a predetermined operation is performed at the retrieval terminal 30. In the example shown in FIG. 16, in the public-method setting section 452, a "collection", multiple social networking services (SNS) such as "SNS #A" and "SNS #B", and an "external app" are provided as setting items. The public-method setting section 452 can specify more than one public method at the same time.

Out of the public methods that can be set in the public-method setting section 452, with the setting item "collection", information of a campaign is stored in the retrieval terminal 30. With the setting items "SNS #A" and "SNS #B", information of the campaign is posted in the SNS A and the SNS #B, respectively. In the setting items "SNS #A" and "SNS #B", by checking "include URL in post?", a URL can be included in the post. With the setting item "external app", by using an external application, an application program supporting the information processing system 1 is caused to display information of the campaign in the retrieval terminal 30.

In the input region 453, a posting message for posting the information of the campaign in the SNS #A and the SNS #B are input when opening to the public by the setting items "SNS #A" and "SNS #B," are set in the public-method setting section 452. In the input region 454, for example, remarks about the campaign are input.

The button 455*a* is to reflect information input and set in the input regions 451*c* to 451*e*, 453, and 454 and in the public-method setting section 452 as setting information of the campaign, and to return to the edit screen 480. This setting information of the campaign is included in metadata of the campaign. When the button 455*a* is operated, the registration tool 21 updates the record and metadata corresponding to the campaign, for example, based on the information input to the input region 451*c* to 451*e*, 453, and 454, and the set value that is set at the public-method setting section 452. The button 455*b* is to return to the edit screen 480 without performing update of the record and the metadata corresponding to the campaign.

Returning back to explanation of FIG. 14, the button group 4887 includes three buttons to perform copy, paste, and delete of information, respectively.

The button 4888 is to perform similar image check in which whether or not an image including a portion similar to a part or a whole of the image (page) 4840 that is currently displayed in the page edit region 484 of the edit screen 480 has already been registered in the image retrieval server 10 is checked. This is performed, for example, on the registration server 50 as a target instead of the image retrieval server 10, and with an image for which "open to the public" is set by the setting information of the campaign out of images registered in the registration server 50 as a subject of check. Not limited thereto, an image registered in the registration server 50 for which "closed" is set may be a subject of check in addition thereto, and the image retrieval server 10 may be a subject of check directly. The registration tool 21 displays a retrieval result that is transmitted from the registration server 50 with the display unit 206. A user can perform re-edit of the image based on this search result.

At this time, the registration tool 21 may transmit, for example, only an image within a target area that is set according to operation of the button 4884 as a subject of check to the registration server 50, to request retrieval of a similar image. Moreover, the registration tool 21 may exclude an image within a mask area that is set according to operation of the button 4885 from a subject of check. Furthermore, the registration tool 21 may divide the image 4840 that is currently displayed in the page edit region 484, and request search of a similar image by transmitting each of the divided images to the registration server 50, to perform the similar image check for each image.

The button 4889 is to instruct storage of a campaign being edited in the edit screen 480.

Returning back to explanation of FIG. 8, when the button 4889 is operated, the registration tool 21 shifts the processing to step S125, and starts storage processing of a campaign. When the storage processing is started, the registration tool 21 shifts the processing to step S126, and determines whether or not the campaign being a save target is a newly registered campaign. When the processing is shifted from step S122 described above to this step S126, the registration tool 21 determines that it is not a newly registered campaign, and shifts the processing to step S127.

On the other hand, when the processing shifts from step S123 described above to this step S126, the registration tool 21 determines that it is a newly registered campaign, and shifts the processing to step S130.

At step S130, the registration tool 21 performs the similar image check in which whether or not an image including a portion similar to a part or whole of the respective images described above has already been registered in the registration server 50 is determined, for an image for which a target area is set among images included in the campaign being a save target. For example, the registration tool 21 transmits all of images included in a campaign being a save target to the registration server 50, and requests retrieval of a similar image. When determined that a similar image is not registered in the registration server 50 based on a retrieval result at next step S131, the registration tool 21 shifts the processing to step S127.

Figure 17:
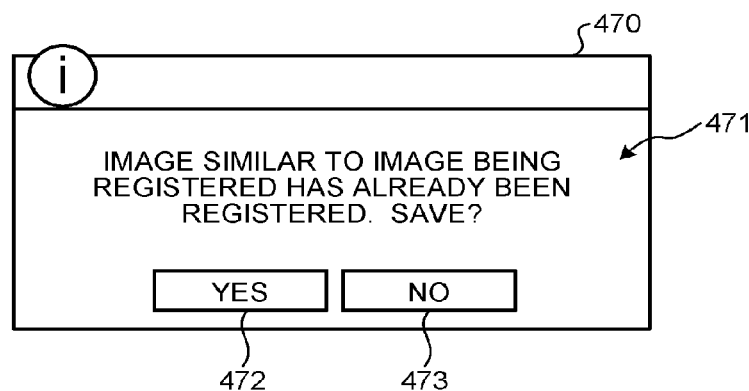
FIG. 17 is a diagram illustrating an example of a warning screen according to the embodiment.

On the other hand, when determined that a similar image is registered in the registration server 50 based on a retrieval result at step S131, the registration tool 21 shifts the processing to step S132. The registration tool 21 performs display of, for example, a warning screen that is exemplified in FIG. 17 with the display unit 206 at step S132. As shown in FIG. 17, in a warning screen 470, a warning message 471 indicating that "a similar image has already been registered in the registration server 50" is displayed, and a "YES" button 472 and a "NO" button 473 are arranged.

When the "NO" button 473 is operated in the warning screen 470, the registration tool 21 can perform avoidance processing for registration of a similar image. As one example, the registration tool 21 performs display of a message to prompt performance of the avoidance processing for the registration of a similar image with the display unit 206, and returns the processing to step S124. In this case, as the avoidance processing, for example, change of an image included in the campaign being a save target, setting of a mask area in the image, change of a target area, and the like can be considered. When the avoidance processing is performed, the processing is shifted to step S127.

On the other hand, when the "YES" button 472 is operated in the warning screen 470, the registration tool 21 can shift the processing to step S127 without performing the avoidance processing described above, and perform registration of the image.

At step S127, the registration tool 21 transmits information of the campaign to the registration server 50, and requests update of the information to be registered in the registration server 50. For example, the registration tool 21 transmits the respective images included in the campaign, the respective association information associated with the respective images, and metadata of the campaign to the registration server 50. The registration server 50 updates the image DB 14, the association information DB 15, and the metadata DB based on the respective information transmitted from the registration tool 21, in response to the request from the registration tool 21.

Upon transmitting the request for information update to the registration server 50 at step S127, the registration tool 21 returns the processing to step S105.

Method of Associating Association Information According to Embodiment

Next, method of associating association information according to the embodiment is explained. As described above, in the embodiment, the registration tool 21 can associate more than one piece of association information to a single target area such as the target area 4841*a*.

With a target area, various kinds of information can be associated as the association information. For example, as the association information, there are information that is presented by the internal browser unit 301 in the retrieval terminal 30, information that is presented by the external browser unit 302, and information that can be presented by both of the internal browser unit 301 and the external browser unit 302. Moreover, as information that is presented to each browser unit by the association information, there are a URL that simply indicates a link to the web site 42*a*, information to perform post and public setting for an SNS, information to instruct reproduction of moving image data or sound data that are placed at a predetermined address on the Internet 41, and the like. Furthermore, if the retrieval terminal 30 has a telephone function, the association information can include information to activate the telephone function. It can be considered that each of the various kinds of association information includes various different setting items. Therefore, the work of associating association information with a target area performed by a user can be complicated. In the embodiment, a method of associating association information that enables easy setting of the association information is provided.

A specific example of associating a target area with association information is explained. As described above, the information indicating a target area is stored and registered in the association information DB 15 with being associated with the image identification information. In the embodiment, the information indicating a target area is described by using, for example, the XML that is one of markup languages to define and describe meanings and structures of data using tags. In the association information DB 15, a file name of a file including an XML code that describes the information indicating this target area, and the image identification information are stored in an associated manner.

Figures 18, 19:
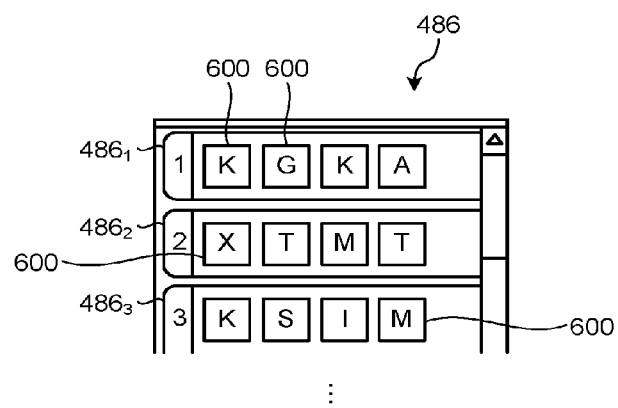
FIG. 18 is a diagram illustrating one example of an extensible markup language (XML) code in which information indicating a target area is described.
FIG. 19 is a diagram illustrating in more detail a target-area list region according to the embodiment.

FIG. 18 illustrates one example of the XML code in which information indicating a target area is described. An XML code 140 shown in FIG. 18 is an example of describing a target area in a content page of a catalogue magazine. A part between outermost tags "" and "" defines the page. In each of parts $141_1$ and $141_2$, a part between tags "<hotspot>" and "</hotspot>" defines one target area. As described, more than one target areas can be defined for one page.

In the part $141_1$, for a first line 142, a part between tags "<area>" and "</area>" defines a range in the page of the target area, for example, with coordinates (x1, y1) at an upper left corner and coordinates (x2, y2) at a lower right corner.

In each of parts $143_1$ and $143_2$, a part between tags "<link>" and "</link>" defines one piece of association information. As described, more than one piece of association information can be defined for one target area. For example, as exemplified by the part $143_1$ in FIG. 18, a part between tags "<title>" and "</title>" defines a title of the association information. A part between tags "<type>" and "</type>" defines a type of this association information.

In this example, as the association information, a part between tags "<URI>" and "</URI>" defines address information on a network such as the Internet 41. In this case, by adding an argument to a uniform resource identifier (URI), for example, action of a browser application that has read the URI can be specified. Moreover, the association information is not limited to a URI. By defining a tag in advance, various kinds of association information can be described. For example, as association information, information to activate a specific application program can be described also.

Furthermore, in this example, in the association information defined by the part between the tags "<link>" and "</link>", three items are defined by the tags "<title>" and "</title>", the tags "<type>" and "</type>", and the tags "<URI>" and "</URI>".

This is not limited to this example, but more items can be defined for the part between the tags "<link>" and "</link>". For the part between the tags "<link>" and "</link>", image data may be defined as an item, and image data itself of the target area may be described.

As described, because the target area in the page, and the association information in the target area are defined by the XML code 140, a function based on the association information that is associated with an object included in the target area in the page can be performed.

User Interface According to Embodiment

Next, a user interface to perform setting of the association information according to the embodiment is explained. As described above, on the edit screen 480, by selecting the icon image 600 indicating desired association information from among the icon images 600, 600, . . . that are displayed in the link-icon list region 487 and by dragging and dropping to a target area, the association information can be associated with the target area. A list of target areas with which association information is associated is displayed in the target-area list region 486.

FIG. 19 illustrates the target-area list region 486 shown in FIG. 14 in more detail. In the target-area list region 486, each of areas $486_1$, $486_2$, $486_3$, . . . indicates a target area with which association information is associated. Moreover, in each of the areas $486_1$, $486_2$, $486_3$, . . . , the icon images 600, 600, . . . that indicate the association information that is associated with the corresponding target area are displayed.

That is, in FIG. 19, contents of the target-area list region 486 correspond to contents described in the XML code 140 in FIG. 18. For example, the areas $486_1$ and $486_2$ that correspond to the respective target areas correspond to the respective parts $141_1$ and $141_2$ in FIG. 18. Furthermore, for example, two out of the icon images 600, 600, . . . included in the area $486_1$ correspond to the parts $143_1$ and $143_2$ in FIG. 18, respectively.

An example of the items that can be set for association information are explained more specifically. FIG. 20 illustrates one example of an association-information setting table according to the embodiment in which a list of items that can be set for the association information is stored. This association-information setting table is stored, for example in the storage 3006 of the registration terminal 20. It is not limited thereto, but it may be configured such that the association-information setting table is held by the registration server 50, and the registration terminal 20 acquires the association-information setting table from the registration server 50.

In FIG. 20, each record (each line) in the association-information setting table respectively indicates association information. In the example shown in FIG. 20, each record includes respective items of "No.", "icon name", "icon", "activated app choice", "title", "URL", "shortened URL/shortened URL setting button", "telephone number", "To/Subject", "Body", "Public Device", "GPS", "Collection", "SNS (#A, #B)" and "OpenIn". Note that the item "No." is provided to identify each record.

In FIG. 20, in the items "icon name" and "icon", information relating to an icon that indicates the association information of the record is described. Specifically, in the item "icon", an icon image is described, and in the item "icon name", a name given to the icon is described. In the example shown in FIG. 20, an icon image is shown in the item "icon" for explanation's sake; however, in an actual state, for example, a file name of the icon image including a pass is described.

In the item "activated app choice", information (name or type) indicating an application program that can be activated by the association information of the record is described. In this item, information indicating multiple application programs can be described. In this case, when the association information of this record is selected in the retrieval terminal 30, a user interface allowing to select an application program to be activated, from among the multiple application programs is provided to the retrieval terminal 30.

In the example shown in FIG. 20, as application programs that are described in the item "activated app choice", a value "Place", a value "E-mail", a value "internal browser", a value "Map", a value "Phone", a value "internal player", and a value "dedicated Movie" are defined.

Out of these values, the value "Place" causes to perform a function of the external browser unit 302 in the retrieval terminal 30, the value "internal browser" causes execution of the function of the internal browser unit 301. The value "E-mail" causes execution of the e-mail function that is equipped in the retrieval terminal 30. Moreover, the value "Map" causes execution of a map display function equipped in the retrieval terminal 30. The value "Phone" causes execution of the telephone function equipped in the retrieval terminal 30. The value "internal player" causes execution of the internal player function to reproduce a moving image, sound, and the like equipped in the retrieval terminal 30. Furthermore, the value "dedicated Movie" causes execution of the moving-image reproducing function that particularly supports a predetermined video streaming service equipped in the retrieval terminal 30.

These items of "icon name", "icon", and "activated app choice" are set, for example, by the information processing system 1 in advance.

In the association-information setting table, the item "title" indicates setting for a title of the association information corresponding to the record, and the item "URL" indicates setting for a URL of a link destination of the association information corresponding to the record. The item "shortened URL/shortened URL setting button" indicates setting for a shortened URL of the link destination of the association information corresponding to the record. The item "telephone number" indicates setting for making a call based on the association information corresponding to the record. The item "To/Subject" indicates setting for a destination and a title of an e-mail and the like that is to be transmitted by the association information corresponding to the record.

The item "Body" indicates setting for text to be transmitted by the association information corresponding to the record. The item "public device" indicates setting for a public device to open the association information corresponding to the record to the public. The item "GPS" indicates setting for use of position information of the association information corresponding to the record.

The items "Collection", "SNS", and "OpenIn" indicate settings relating to opening the association information corresponding to the record to the public. Specifically, the item "Collection" indicates setting for operation to store the association information corresponding to the record in the retrieval terminal 30. The item "SNS" indicates setting for sharing with an SNS of the association information corresponding to the record and posting in the SNS. The item "OpenIn" indicates setting relating to selection of an application program to be activated from the association information corresponding to the record.

In the association-information setting table, for respective items other than the items "icon name", "icon", and "activated app choice" for which values are set in advance, information indicating that setting of the item is required, arbitrary, optional, or disabled is described. More specifically, in the example shown in FIG. 20, in each record, an item for which "a mark of double circle" is shown signifies an input required item for which input is required. An item for which "a mark of circle" is shown signifies an arbitrary setting item for which input is not required. Moreover, an item for which "a mark of triangle" is shown signifies an optional item for which necessity of setting is lower than the arbitrary setting item. Furthermore, an item with a blank field signifies an item for which setting is not necessary or setting is disabled.

For example, the item "title" that indicates setting for the title of the association information corresponding to the record is a required item in all records. On the other hand, the item "telephone number" that indicates setting for making a phone call from the association information corresponding to the record is set as a required item only in a record for which the value "Phone" is set in the item "activated app choice", while setting are disabled in other records. Note that the setting of each item including the arbitrary setting item shown in FIG. 20 is not limited to the example shown in FIG. 20.

Figure 21:
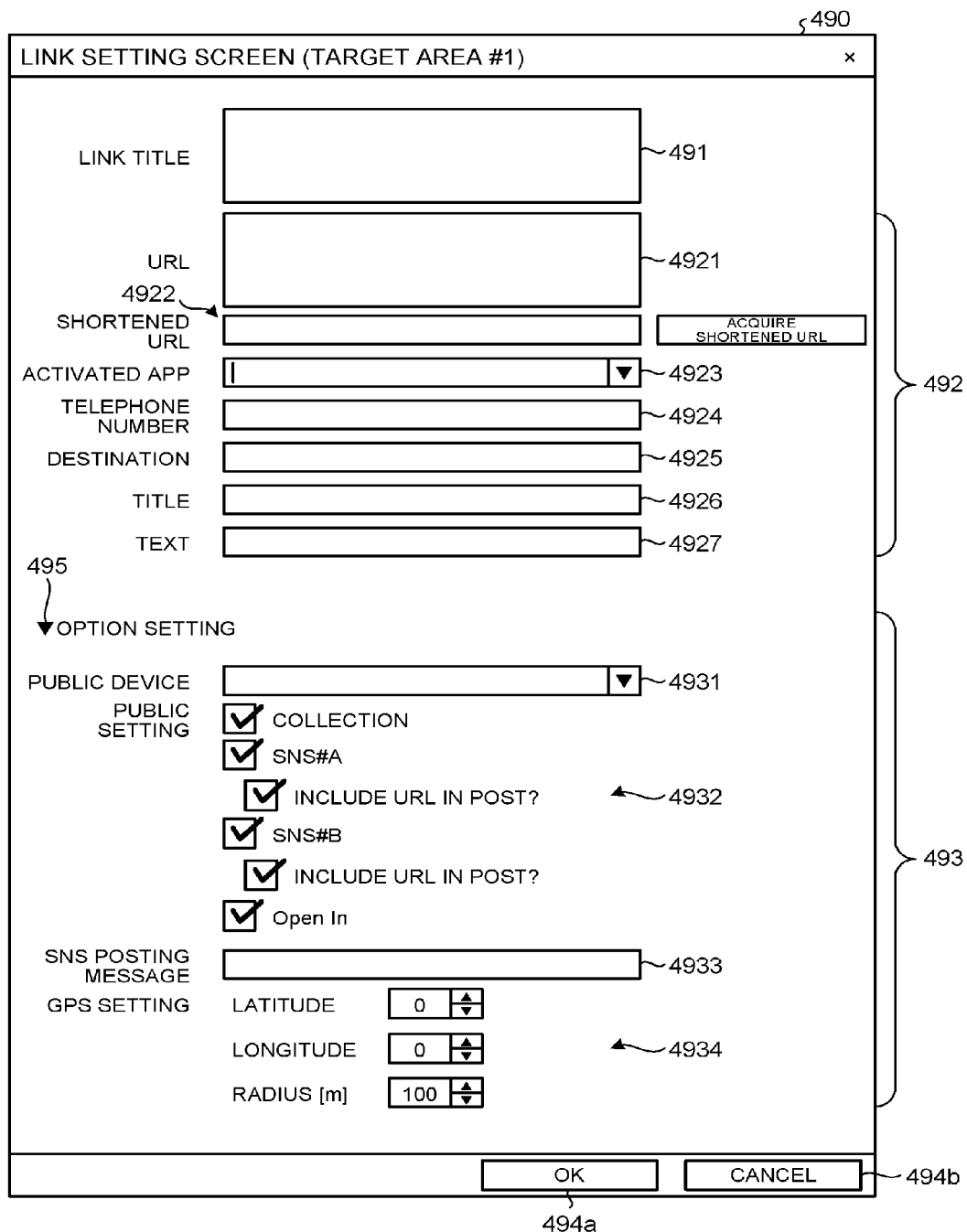
FIG. 21 is a diagram illustrating one example of an item setting screen to set each item of the association information according to the embodiment.

FIG. 21 illustrates one example of the item setting screen 490 to set each item shown in FIG. 20 according to the embodiment. When, for example, each of the icon images 600, 600, . . . displayed in the target-area list region 486 shown in FIG. 14 and FIG. 19 are specified, the registration tool 21 causes the display unit 206 to display the item setting screen 490 in which setting of setting items of association information that is indicated by the specified icon image 600. Not limited thereto, the item setting screen 490 may be displayed by specifying information that indicates association information displayed in the preview region 485.

In FIG. 21, in the item setting screen 490, a title input section 491 to which a title of association information is input, an input region 492 including respective input sections 4921 to 4927 at which input for the required item and the arbitrary setting item is performed, and an input region 493 including respective input sections 4931 to 4934 at which input for the optional item is performed are arranged. Furthermore, in the item setting screen 490, an OK button 494a to finalize information that is input to the item setting screen 490, a cancel button 494b to cancel input information, and a button 495 to switch between showing and hiding of the input region 493 are arranged.

To the title input section 491, information corresponding to the item "title" in the association-information setting table in FIG. 20 is input.

Information corresponding to the items "URL" and "shortened URL/shortened URL setting button" in the association-information setting table are input to the input sections 4921 and 4922 out of the input sections 4921 to 4927 included in the input region 492. A "shortened URL acquisition" button arranged on a right side of the input section 4922 is a button to access a shortened URL generating service on the Internet 41, for example, and to acquire a shortened URL based on a URL input to the input section 4921. To an input section arranged on a left side of the input section 4922, the shortened URL is directly input.

To the input section 4923, information corresponding to the item "activated app choice" in the association-information setting table is input. For example, when multiple application programs are described in the item "activated app choice", by operating a button that is arranged on a right end of the input section 4923, a dropdown list from which an application program to be activated is selected from among the application programs is displayed. Moreover, in this dropdown list, a choice of not specifying an application program can further be provided.

To the input section 4924, information (telephone number) corresponding to the item "telephone number" in the association-information setting table is input. To the input sections 4925 and 4926, a destination of an e-mail and a title are input with corresponding to the item "To/Subject" in the association-information setting table. And, to the input section 4927, text of a short message service (SMS) is input, the SMS being corresponding to the item "Body" in the association-information setting table, and being communicated, for example, by using a telephone function.

The registration tool 21 controls displaying of the input sections 4921 to 4927 according to values of respective items in each record in the association-information setting table. For example, the registration tool 21 controls to hide the input section corresponding to an item of a blank field for one record. Not limited thereto, the registration tool 21 may control the input section corresponding to an item with a blank field to be in an input disabled state.

For example, in FIG. 20, in the record in which the value of the item "No." is "1" in the association-information setting table, the items "telephone number", "To/Subject", and "Body" are blank. Accordingly, the registration tool 21 controls to hide the input sections 4924, 4925, 4926, and 4927 in the input region 492 of the item setting screen 490. Moreover, for example, in the record in which the value of the item "No." is "2" in the association-information setting table, the items "URL", "shortened URL/shortened URL setting button", "telephone number", and "Body" are blank. Accordingly, the registration tool 21 controls to hide the input sections 4921, 4922, 4924, and 4927 in the input region 492 of the item setting screen 490.

The input region 493 includes the input sections 4931 to 4934. To the input section 4931, information corresponding to the item "public device" in the association-information setting table is input. At this time, when the association information of the record is enabled be open to the public by more than one device, by operating a button provided on a right end of the input section 4931, a dropdown list to select a device enabled to open to the public from among the devices is displayed. Moreover, it is preferable that a choice of not specifying a device of opening to the public be provided in this dropdown list.

In an input section 4932, information corresponding to the items "Collection", "SNS", and "OpenIn" in the association-information setting table is input. In the example shown in FIG. 20, each information is input by checking a checkbox of a corresponding item. Moreover, in this example, it is enabled to set whether to share with two kinds of SNSs (SNS #A and SNS #B), and if set to share, whether a URL is included in a post. In an input section 4933, a posting message for an SNS for which the sharing is enabled is input.

In an input section 4934, information corresponding to the item "GPS" in the association-information setting table is input. In this example, the input section 4934 includes a setting section to set a latitude and a longitude, and a setting section to set a radius, and can set an area corresponding the association information of the record.

The registration tool 21 controls display in the input sections 4931 to 4934 according to a value of each item in each record of the association-information setting table, similarly to the case of the input region 492 described above. The registration tool 21 controls to hide an input section that corresponds to an item in blank for one record. Not limited thereto, the registration tool 21 may control to set an input section that corresponds to an item in blank to be in an input disabled state.

Figure 22:
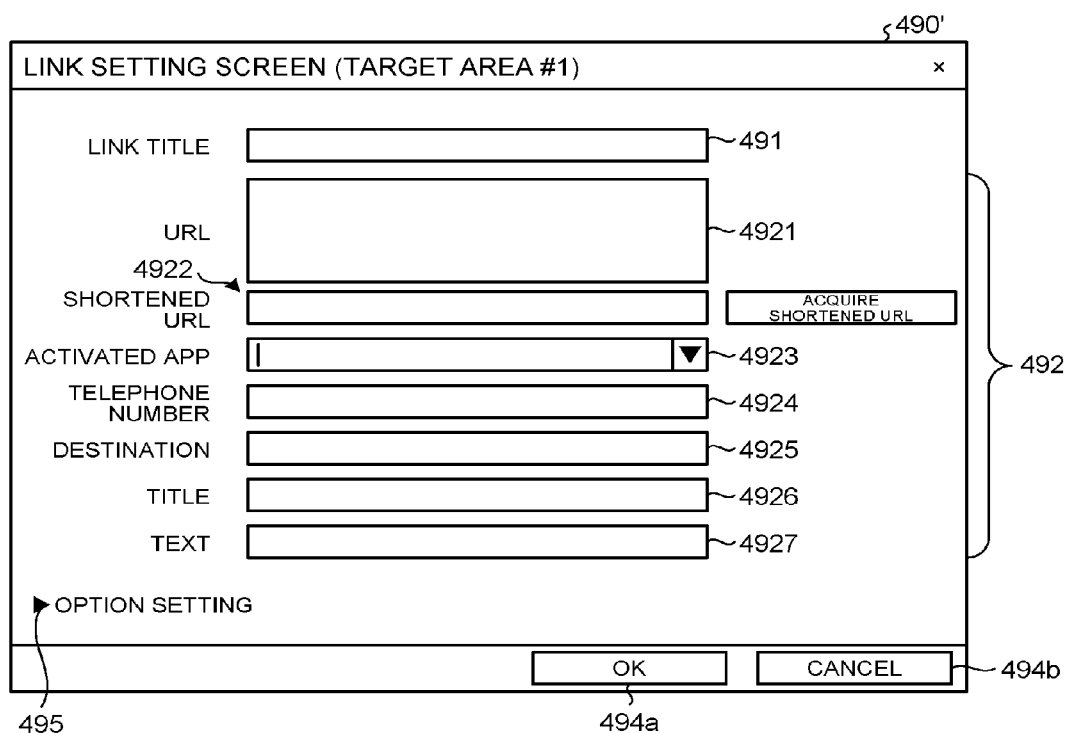
FIG. 22 is a diagram illustrating an example of an item setting screen in a state in which a part of an input region is hidden according to the embodiment.

Items set by the respective input section 4931 to 4934 that are arranged in the input region 493 are items set to be optional setting in the association-information setting table. Therefore, in the example shown in FIG. 21, it is configured such that an entire display of the input region 493 can be hidden by operating the button 495 arranged at an upper left part of the input region 493. FIG. 22 depicts an example of an item setting screen 490' in a state in which an entire part of the input region 493 is hidden according to the embodiment. In this item setting screen 490', by operating the button 495, the input region 493 that has been hidden can be displayed, to return to the item setting screen 490 in FIG. 21.

When the OK button 494a is operated, the registration tool 21 finalizes each value set in the item setting screen 490. For example, when the OK button 494a is operated, the registration tool 21 generates the XML code 140 described above based on a value of each item set in the item setting screen 490, and stores the generated XML code 140 in the storage 2006 or the RAM 2003, and then finalizes each value. That is, the registration tool 21 functions as a setting unit that sets each value according to association information by the item setting screen 490.

The registration tool 21 stores the XML code 140 thus generated in a file, and includes this file in information of a campaign, for example, at step S127 in FIG. 8, to transmit to the registration server 50. The registration server 50 updates the image DB 14, the association information DB 15, and the metadata DB based on each information transmitted from the registration terminal 20, in response to a request from the registration tool 21.

As described, in the embodiment, when each item of association information is set, a necessary input section is selectively displayed in the item setting screen 490 based on the association-information setting table. Moreover, when multiple application programs are enabled to be activated from the association information, an application program to be activated can be specified from a dropdown list that has been set in advance and displayed in the input section 4923. Therefore, a user can immediately grasp a setting item that is necessary to perform setting of the association information, and the setting of the association information can be performed easily.

Display Example in Retrieval Terminal

Next, an example of display in the retrieval terminal 30 according to the embodiment is explained. As shown in FIG. 1 and FIG. 2, the subject 40 is imaged in accordance with control by the UI control unit 3011 according to operation made by a user in the internal browser unit 301 of the retrieval terminal 30, and a captured image and a retrieval request are transmitted to the image retrieval server 10. The image retrieval server 10 retrieves an image including an image that is similar to the captured image in accordance with the image retrieval request transmitted from the retrieval terminal 30, and acquires the XML code 140 (see FIG. 18) that corresponds to the image. As explained using FIG. 18, this XML code 140 includes association information corresponding to the image and information of a target area. The image retrieval server 10 stores the acquired XML code 140, for example, in a file to transmit to the retrieval terminal 30.

The retrieval terminal 30 receives the XML code 140 transmitted from the image retrieval server 10 by the receiving unit 303, and transfers to the UI control unit 3011 of the internal browser unit 301. The UI control unit 3011 generates a browsing screen based on the transferred XML code 140, to display with the display unit 306.

Figure 23:
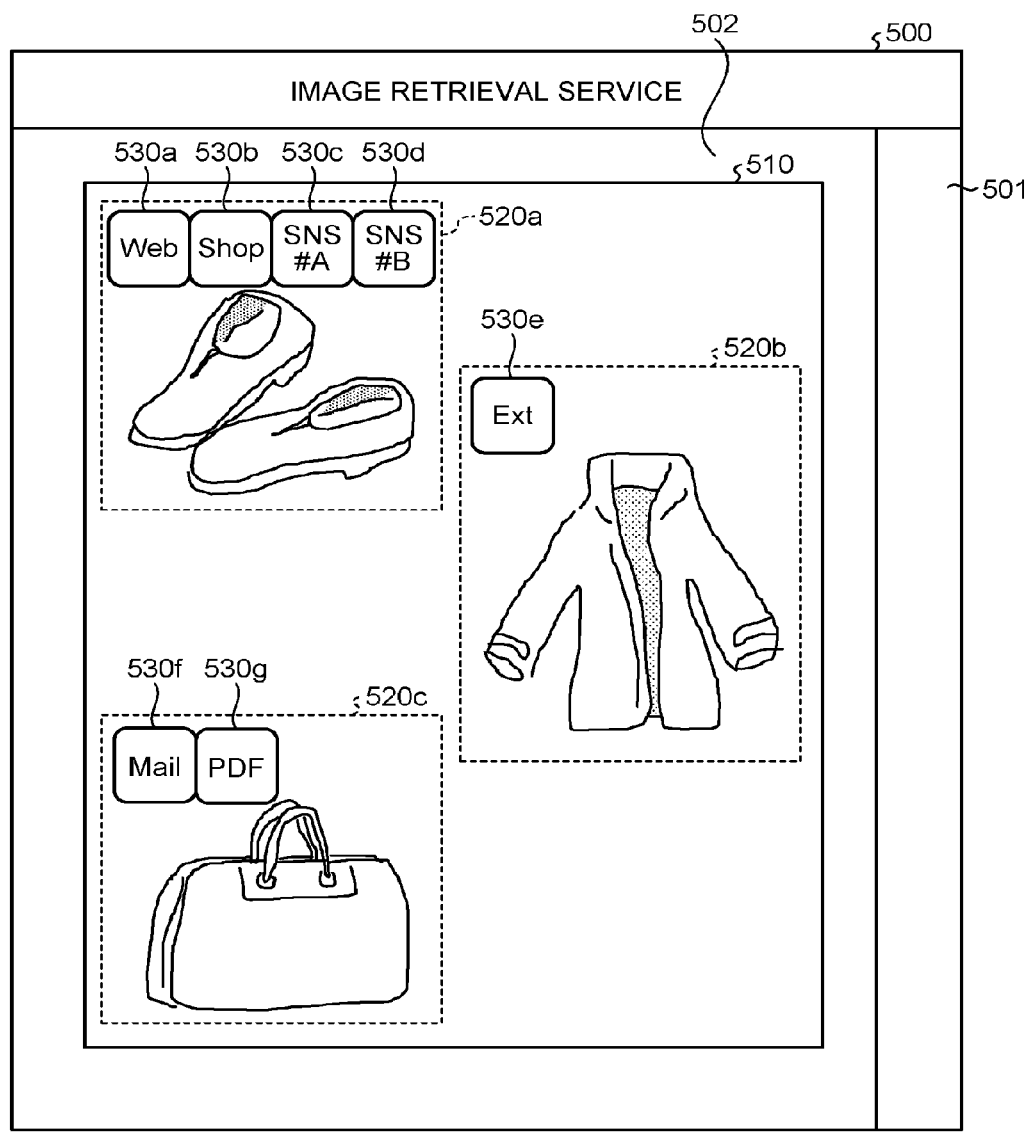
FIG. 23 is a diagram illustrating an example of a browsing screen that is displayed by control of a user-interface (UI) control unit according to the embodiment.

FIG. 23 illustrates an example of a browsing screen that is displayed by control of the UI control unit 3011 according to the embodiment. In FIG. 23, a browsing screen 500 includes a link display region 501 and a page-image display region 502. The page-image display region 502 is a region in which a page 510 according to the XML code 140 is displayed. The size of a page may be fixed, or may be provided in the XML code 140. As shown in FIG. 18, the UI control unit 3011 performs displaying in respective target areas 520a, 520b, and 520c according to description of the line 142 of the XML code 140.

The UI control unit 3011 displays images acquired according to link information that is described in the XML code 140 in the respective target areas 520a, 520b, and 520c. Not limited thereto, when image data is included in the XML code 140, the UI control unit 3011 can display images according to the image data in the respective target areas 520a, 520b, and 520c.

Furthermore, the UI control unit 3011 displays icon images 530a to 530g indicating the association information that is associated with the respective target areas 520a, 520b, and 520c, in the respective target areas 520a, 520b, and 520c. In the example shown in FIG. 23, the four icon images 530a to 530d are displayed in the target area 520a, and it is indicated that four pieces of the association information are associated with the target area 520a. Similarly, the icon images 530f and 530g are displayed in the target area 520c, and it is indicated that two pieces of the association information are associated with the target area 520c. Moreover, one piece of the icon image 530e is displayed in the target area 520b, and it is indicated that one piece of the association information is associated with the target area 520b.

Figure 24:
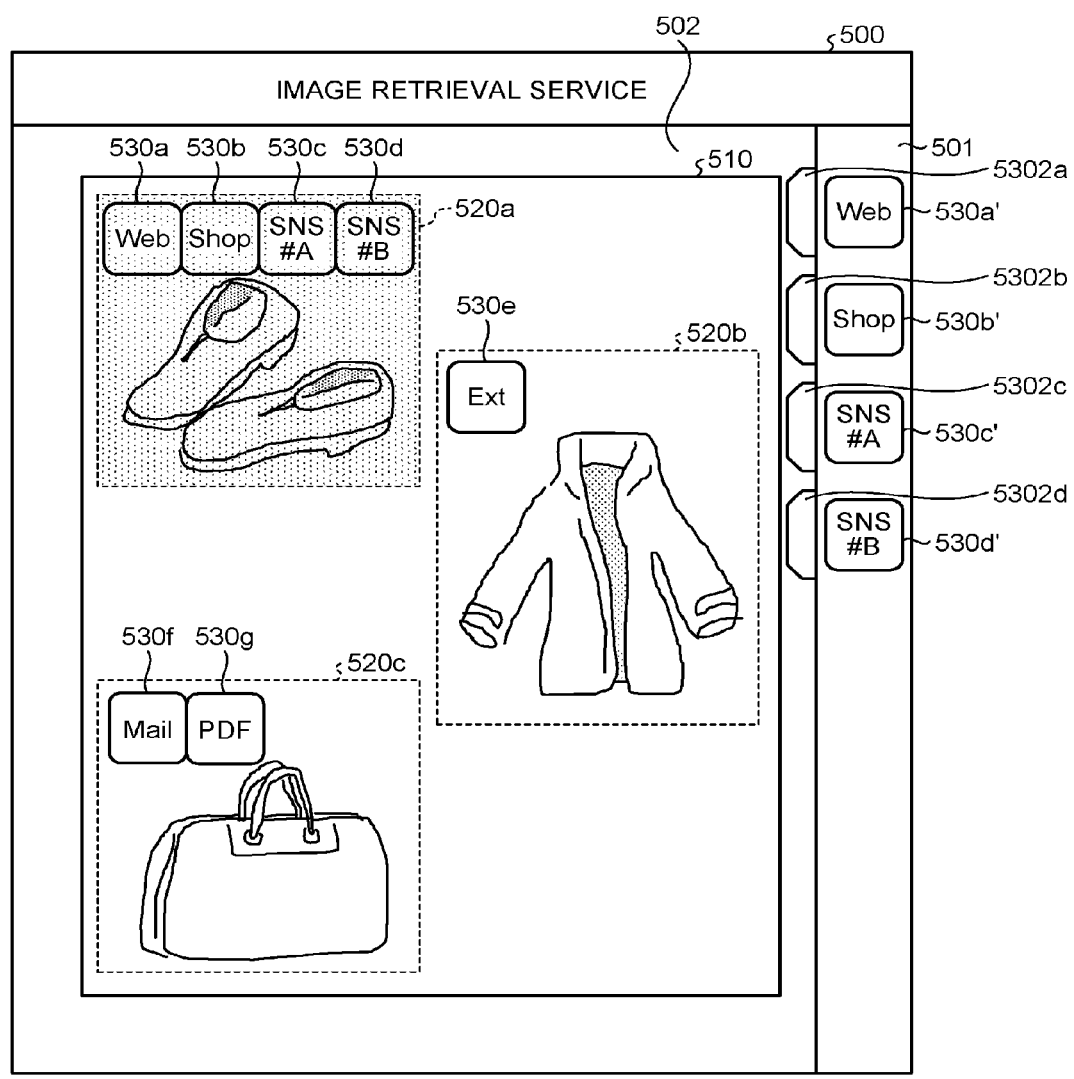
FIG. 24 is a diagram illustrating an example of specifying a target area in the browsing screen according to the embodiment.

To such a displaying of the browsing screen 500, by specifying one target area, a user can use association information that is associated with the specified target area. FIG. 24 illustrates an example of specifying the target area 520a to the browsing screen 500 of FIG. 23. In the example shown in FIG. 24, the specified target area 520a is displayed in an emphasized manner. When the target area 520a is specified, the UI control unit 3011 displays icon images 530a', 530b', 530c', and 530d' that indicate association information that is associated with the specified target area 520a, in the link display region 501. These icon images 530a' to 530d' correspond to the icon images 530a to 530d, respectively.

Moreover, the UI control unit 3011 displays tabs 5302a, 5302b, 5302c, and 5302d at positions corresponding to the icon images 530a', 530b', 530c', and 530d', respectively, in the page-image display region 502. By operating the tabs 5302a, 5302b, 5302c, and 5302d, association information indicated by an icon image that corresponds to the operated tab is enabled to be used.

Figure 25A:
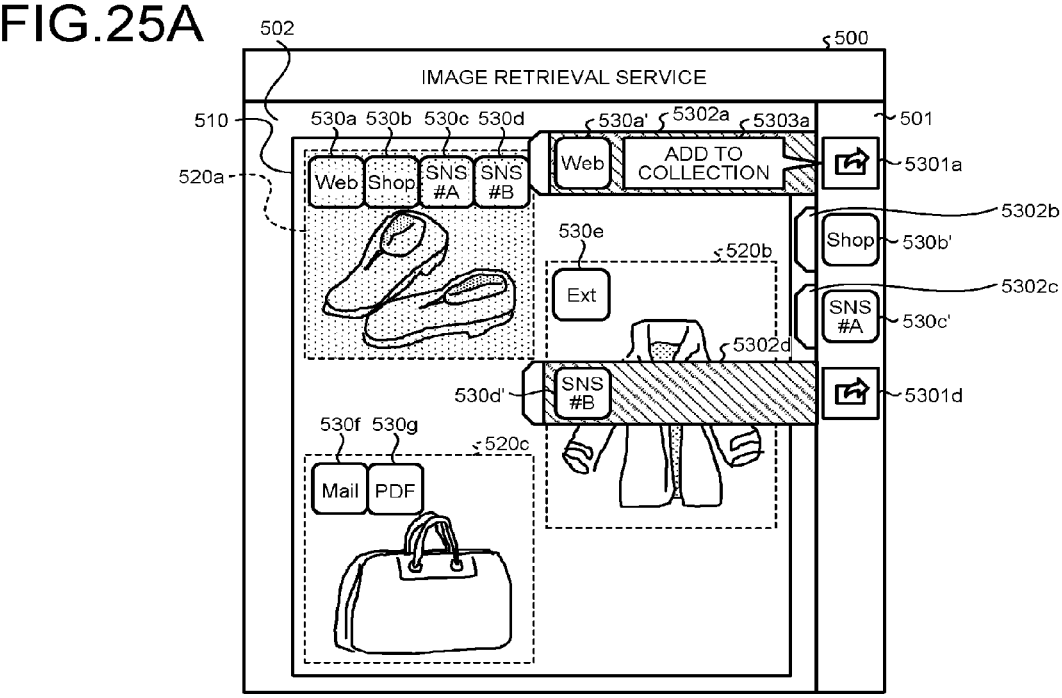
FIGS. 25A and 25B are diagrams illustrating an example of operating a tab in a display in which the target area is specified in the browsing screen according to the embodiment.
Figure 25B:
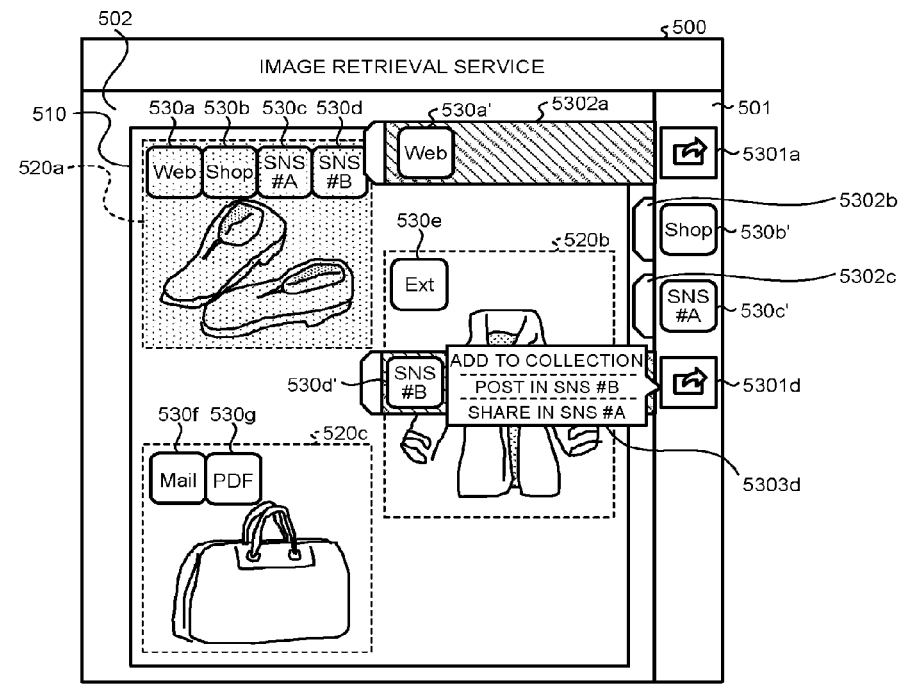

FIG. 25A and FIG. 25B illustrate examples of operating the tabs 5302a and 5302d in a display in FIG. 24. In this example, when, for example, the tab 5302a is operated, the image of the tab 5302a is changed to an image that looks as if the tab 5302a extends toward a direction of the page-image display region 502. In addition, at an extended end portion of the tab 5302a, the icon image 530a' corresponding to the tab 5302a is displayed. The tab 5302d is configured similarly. Furthermore, at respective positions at which the icon images 530a' and 530d' had been displayed in the link display region 501, icon images 5301a and 5301d that specify use of functions indicated by the icon images 530a' and 530d' are displayed, respectively. As described, by changing the image of the operated tab 5302a, it is indicated that association information indicated by the icon image 530a' that corresponds to the tab 5302a is in a use enabled state.

As one example, a case in which the internal browser unit 301 is specified as an application program to be activated, for the icon image 530a', and association information indicated by the icon image 530a' specifies that the association information can be stored in the retrieval terminal 30 is considered. In this case, the UI control unit 3011 displays a message 5303a of "add to collection" on the tab 5302a, as exemplified in FIG. 25A, and prompts a user to store the association information indicated by the icon image 530a' in the retrieval terminal 30. When the icon image 5301a is operated, the UI control unit 3011 stores the association information indicated by the icon image 530a', for example, in the storage 3006 of the retrieval terminal 30.

As another example, a case in which the internal browser unit 301 is specified as an application program to be activated, for the icon image 530*d*, and association information indicated by the icon image 530*d* specifies storage into the retrieval terminal 30, sharing in the SNS #A, and posting in the SNS #B of the association information is considered. In this case, the UI control unit 3011 displays a message 5303*d* for which "add to collection", "post in SNS #B", and "share in SNS #A" can be selected is displayed on the tab 5302*d* as exemplified in FIG. 25B, and prompts a user to select processing. The UI control unit 3011 performs selected processing according to the message 5303*d*. For example, when "post in SNS #B" is selected, the UI control unit 3011 performs posting processing in the SNS #B based on the association information indicated by the icon image 530*d'*.

As another example, when the external browser unit 302 is specified as an application program to be activated for the icon image 530*a'*, the UI control unit 3011 calls the external browser unit 302 by the calling unit 3014 according to operation to the icon image 5301*a* that corresponds to this icon image 530*a'* to activate the external browser unit 302.

As for a difference in operation between the internal browser unit 301 and the external browser unit 302, for example, in the case of accessing to a specified URL, the internal browser unit 301 does not display the URL explicitly. On the other hand, the external browser unit 302 accesses the URL while displaying the URL.

According to the present invention, an effect that registration of association information in a system in which the association information is output as a result of image retrieval is facilitated is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information processing apparatus, comprising:
 a communication interface that is connected to an image retrieval device via a network, the image retrieval device including a registration memory in which an image and one or more pieces of association information are registered in an associated manner, and a processor that retrieves an image that is similar to a retrieval subject image from the registration memory and a transmits the one or more of association information associated with the retrieved image to a retrieval terminal device;
 processing circuitry that
  selects, from a plurality of types of the association information, particular association information to be associated with an acquired registration target image specified as a target to be newly registered in the registration memory, the selected association information including an application program to be activated in the retrieval terminal device and a value to be used by the activated application program, and
  performs setting of a setting item that depends on a type of the selected association information; and
 a transmitter that transmits the registration target image and the selected association information in which the setting item is set, to the image retrieval device to be registered in an associated manner in the registration memory.

2. The information processing apparatus according to claim 1, wherein the processing circuitry presents a first setting item that is specified in advance for the selected association information, out of all setting items enabled to be set for the association information.

3. The information processing apparatus according to claim 2, wherein the processing circuitry is enabled to switch between showing and not showing of a setting item that is set as an optional setting, out of setting items that are specified in advance.

4. The information processing apparatus according to claim 1, wherein the processing circuitry selects the association information to be respectively associated with one or more of areas that are specified for the registration target image.

5. The information processing apparatus according to claim 2, wherein the processing circuitry selects the association information to be respectively associated with one or more of areas that are specified for the registration target image.

6. The information processing apparatus according to claim 3, wherein the processing circuitry selects the association information to be respectively associated with one or more of areas that are specified for the registration target image.

7. The information processing apparatus according to claim 1, wherein the association information includes, as the setting item, information that specifies the application program for a computer mounted in the retrieval terminal device to execute, the application program being capable to be specified according to the types of the association information.

8. The information processing apparatus according to claim 2, wherein the association information includes, as the setting item, information that specifies a program for a computer mounted in the retrieval terminal device to execute, the program being capable to be specified according to the types of the association information.

9. The information processing apparatus according to claim 3, wherein the association information includes, as the setting item, information that specifies a program for a computer mounted in the retrieval terminal device to execute, the program being capable to be specified according to the types of the association information.

10. The information processing apparatus according to claim 4, wherein the association information includes, as the setting item, information that specifies a program for a computer mounted in the retrieval terminal device to execute, the program being capable to be specified according to the types of the association information.

11. The information processing apparatus according to claim 5, wherein the association information includes, as the setting item, information that specifies a program for a computer mounted in the retrieval terminal device to execute, the program being capable to be specified according to the types of the association information.

12. The information processing apparatus according to claim 6, wherein the association information includes, as the setting item, information that specifies a program for a computer mounted in the retrieval terminal device to execute, the program being capable to be specified according to the types of the association information.

13. An information processing system, comprising:
an image retrieval device, the image retrieval device including a registration memory in which an image and association information are registered in an associated manner, a processor that retrieves an image that is similar to a retrieval subject image from the registration memory and transmits the association information associated with the retrieved image to a retrieval terminal device; and
an image processing apparatus, including processing circuitry that acquires a registration target image to be newly registered in the registration that memory, selects particular association information to be associated with the registration target image, the selected association information including an application program to be activated in the retrieval terminal device and a value to be used by the activated application program, performs setting of a setting item that depends on the selected association information, and transmits the registration target image and the selected association information, in which the setting item is set, to the image retrieval device to be registered in an associated manner in the registration memory.

14. An information processing method implemented in an image processing apparatus that is connected to an image retrieval system via a network, the image retrieval system including a registration memory in which an image transmitted from a terminal device and one or more pieces of association information are registered in an associated manner, a processor that retrieves an image that is similar to a retrieval subject image from the registration memory and transmits one or more pieces of association information associated with the retrieved image to a retrieval terminal device, the information processing method comprising:
acquiring a registration target image to be newly registered in the registration memory;
selecting particular association information to be associated with a registration target image, the selected association information including an application program to be activated in the retrieval terminal device and a value to be used by the activated application program;
performing setting of a setting item according to that depends on the selected association information; and
transmitting the registration target image and the selected association information, in which the setting item is set, to the image retrieval device to be registered in an associated manner in the registration memory.

* * * * *